United States Patent
Arukhe et al.

(10) Patent No.: US 12,546,191 B2
(45) Date of Patent: Feb. 10, 2026

(54) MACHINE LEARNING FRAMEWORK FOR TREATING AND PREVENTING SCALE FORMATION

(71) Applicant: SAUDI ARABIAN OIL COMPANY, Dhahran (SA)

(72) Inventors: James Ohioma Arukhe, Dhahran (SA); Khalid A. Ghamdi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/734,400

(22) Filed: Jun. 5, 2024

(65) Prior Publication Data

US 2025/0376912 A1    Dec. 11, 2025

(51) Int. Cl.
*E21B 37/06* (2006.01)
*C02F 5/08* (2023.01)

(52) U.S. Cl.
CPC ............... *E21B 37/06* (2013.01); *C02F 5/08* (2013.01); *C02F 2209/006* (2013.01); *E21B 2200/22* (2020.05)

(58) Field of Classification Search
None
See application file for complete search history.

(56) References Cited

U.S. PATENT DOCUMENTS

| 10,113,952 B2 | 10/2018 | Washburn | |
|---|---|---|---|
| 2008/0023202 A1* | 1/2008 | Keatch | B26D 3/001 166/311 |

(Continued)

FOREIGN PATENT DOCUMENTS

| AU | 2014203770 B2 | 3/2020 |
|---|---|---|
| EP | 4229273 A1 | 8/2023 |

(Continued)

OTHER PUBLICATIONS

Petukhov, et al., "Comparative Analysis of Full-Scale Observations of Geochemical Composition of Bottom Sediments on Five Squares of the Project "Sakhalin-2"," Proceedings of the Sixth ISOPE Pacific/Asia Offshore Mechanics Symposium, Vladivostok, Russia, Sep. 2004 (4 pages).

(Continued)

*Primary Examiner* — Andrew Sue-Ako
(74) *Attorney, Agent, or Firm* — Osha Bergman Watanabe & Burton LLP

(57) ABSTRACT

A method includes obtaining well data of the well from a well control system and a water treatment system of a well. The method further includes obtaining a set of operation parameters for the well control system and the water treatment system, wherein the set of operation parameters define, at least in part, operation of the well control system and the water treatment system. The method further includes determining, with a machine learning (ML) model, a predicted scale formation based on the well data and determining, based on the predicted scale formation, a recommended treatment comprising a chemical injection using the water treatment system. The method further includes adjusting, with a well controller and a water treatment controller, the set of operation parameters based on, at least, the predicted scale formation, wherein adjusting the set of operation parameters executes the recommended treatment on the well.

17 Claims, 7 Drawing Sheets

(56) References Cited

U.S. PATENT DOCUMENTS

| | | | | |
|---|---|---|---|---|
| 2015/0047673 | A1* | 2/2015 | White | B08B 7/0092 134/17 |
| 2019/0292881 | A1* | 9/2019 | Zhang | E21B 47/10 |
| 2020/0364593 | A1* | 11/2020 | Al-Hajri | E21B 37/00 |
| 2022/0081606 | A1* | 3/2022 | Howe | C09K 8/528 |
| 2023/0003114 | A1* | 1/2023 | Mishkhes | E21B 47/08 |
| 2023/0399938 | A1* | 12/2023 | Hernandez de la Bastida | E21B 37/06 |

FOREIGN PATENT DOCUMENTS

| | | |
|---|---|---|
| WO | 2020/232088 A1 | 11/2020 |
| WO | 2020/232089 A1 | 11/2020 |
| WO | 2022/081533 A1 | 4/2022 |

OTHER PUBLICATIONS

Morrell, Austin, et al., "Characterization of Sub-Log Scale Variability in Mudstones and the Effects of Variable Sampling Scales on High Resolution Models; Examples From Bone Spring Formation, West Texas." Unconventional Resources Technology Conference, Austin, Texas, USA, Jul. 2017 (8 pages).

AlRueshed, AbdulAziz, "Well Integrity Monitoring Enhancement Using Geochemical Water Analysis." SPE Kingdom of Saudi Arabia Annual Technical Symposium and Exhibition, Dammam, Saudi Arabia, Apr. 2016 (12 pages).

Xu, Chicheng, et al., "Machine Learning Assisted Petrophysical and Geochemical Reservoir Description Integrating Multi-Scale Well Data." SPE Annual Technical Conference and Exhibition, San Antonio, Texas, USA, Oct. 2023 (11 pages).

Al-Hajri, Nasser M., et al., "Scale/Prediction/Inhibition Design Using Machine-Learning Techniques and Probabilistic Approach." SPE Gas & Oil Technology Showcase and Conference, Dubai, UAE, Oct. 21-23, 2019 (23 pages).

Al-Hajri, Nasser M., et al., Scale Prediction and Inhibition Design Using Machine Learning Techniques, SPE Gas & Oil Technology Showcase and Conference, Dubai, UAE, Oct. 21-23, 2019 (8 pages).

Amir, M., et al., "Prediction of Iron Carbonate Scale Formation in Iranian Oilfields at Different Mixing Ratio of Injection Water with Formation Water," Energy Sources, Part A, 2013 (10 pages).

Moghadasi, J., et al., Scale Formation in Oil Reservoir and Production Equipment during Water Injection Kinetics of $CaSO_4$ and $CaCO_3$ Crystal Growth and Effect on Formation Damage, SPE European Formation Damage Conference, The Hague, Netherlands, May 13-14, 2003 (12 pages).

Moghadasi, J., et al., "Scale Formation in Iranian Oil Reservoir and Production Equipment during Water Injection.," 5th International Oilfield Scale Symposium and Exhibition, Aberdeen, UK, Jan. 29-30, 2003 (14 pages).

Bahadori, Alireza, "Estimation of Potential Precipitation From an Equilibrated Calcium Carbonate Aqueous Phase Using Simple Predictive Tool," SPE Trinidad and Tobago Energy Resources Conference, Port of Spain, Trinidad, Jun. 27-30, 2010 (8 pages).

Hamid, S., et al., "A Practical Method of Predicting Calcium Carbonate Scale Formation in Well Completions," SPE Saudi Arabia Section Technical Symposium and Exhibition, Al-Khobar, Saudi Arabia, May 19-22, 2013 (11 pages).

Vetter, O.J., et al., "Calcium Carbonate Scale in Oilfield Operations," 62nd Annual Technical Conference and Exhibition of the Society of Petroleum Engineers, Dallas, Texas, Sep. 27-30, 1967 (16 pages).

Yeboah, Y.D. et al., "A New and Reliable Model for Predicting Oilfield Scale Formation," SPE International Symposium on Oilfield Chemistry, New Orleans, Louisiana, Mar. 2-5, 1993 (10 pages).

* cited by examiner

MACHINE LEARNING FRAMEWORK FOR TREATING AND PREVENTING SCALE FORMATION

BACKGROUND

Scale is a hard, crystalline deposit that forms on equipment surfaces, pipelines, and other components of oil and gas facilities due to the precipitation of minerals from a fluid. Scale formation can occur due to a variety of factors, including the presence of minerals like calcium, magnesium, and sulfates, combined with specific operational conditions like temperature and pressure. The presence of scale can lead to reduced flow efficiency, blockages, increased energy usage, and a heightened risk of equipment failure. This not only disrupts operations but also leads to significant maintenance and repair costs. Accordingly, there exists a need for methods and systems capable of accurately determining both the likelihood of scale formation as well as appropriate mitigation strategies for specific operating conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a method for predicting scale formation related to operation of a well, determining a recommended treatment, and optimizing operation of the well. The method includes obtaining well data of the well from a well control system and a water treatment system of a well. The method further includes obtaining a set of operation parameters for the well control system and the water treatment system, wherein the set of operation parameters define, at least in part, operation of the well control system and the water treatment system. The method further includes determining, with a machine learning (ML) model, a predicted scale formation based on the well data and determining, based on the predicted scale formation, a recommended treatment comprising a chemical injection using the water treatment system. The method further includes adjusting, with a well controller and a water treatment controller, the set of operation parameters based on, at least, the predicted scale formation, wherein adjusting the set of operation parameters executes the recommended treatment on the well.

Embodiments disclosed herein generally relate to a system that includes a well control system with a well controller, a water treatment system with a water treatment controller; a plurality of sensors communicatively coupled to the well control system and the water treatment system, and a computer. A set of operation parameters define, at least in part, operation of the well control system and water treatment system. Further, the plurality of sensors is configured to obtain well data. The computer is configured to receive the well data and the set of operation parameters and determine, with a machine learning (ML) model, a predicted scale formation based on the well data. The computer is further configured to determine, based on the predicted scale formation, a recommended treatment comprising a chemical injection using the water treatment system and adjust, with the well controller and the water treatment controller, the set of operation parameters based on, at least, the predicted scale formation. Adjusting the set of operation parameters executes the recommended treatment on the well.

Embodiments disclosed herein generally relate to a non-transitory computer-readable memory with computer-executable instructions stored thereon that, when executed on a processor, cause the processor to perform the following steps. The steps include receiving well data of a well from a well control system and a water treatment system of the well and receiving a set of operation parameters for the well control system and the water treatment system. The set of operation parameters define, at least in part, operation of the well control system and the water treatment system. The steps further include determining, with a machine learning (ML) model, a predicted scale formation based on the well data and determining, based on the predicted scale formation, a recommended treatment comprising a chemical injection using the water treatment system. The steps further include adjusting, with a well controller and a water treatment controller, the set of operation parameters based on, at least, the predicted scale formation, where adjusting the set of operation parameters executes the recommended treatment on the well.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
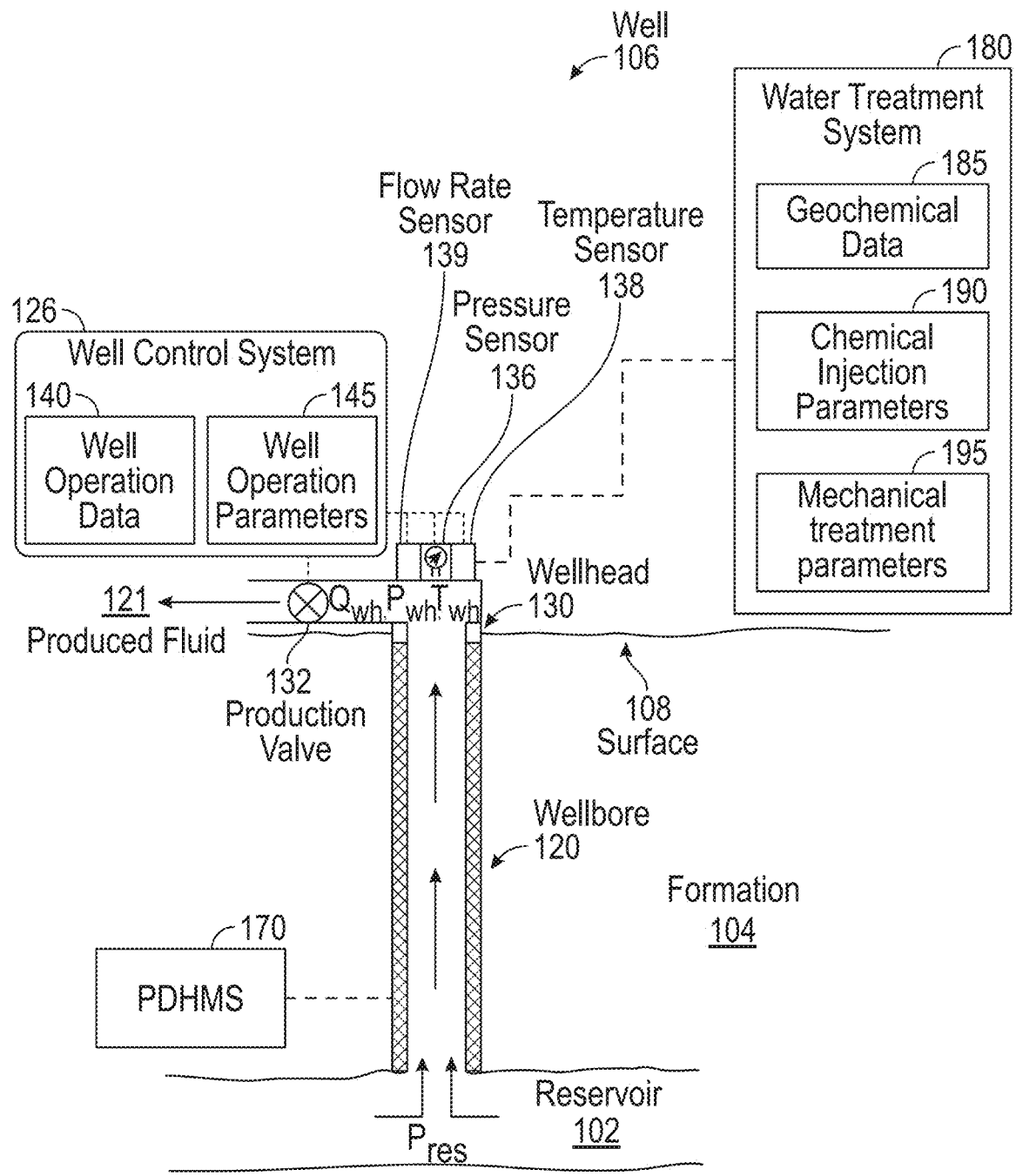
FIG. 1 depicts a well in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. For example, an "oil or gas well," may include any number of "oil or gas wells" without limitation.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In general, embodiments of the disclosure include systems and methods for monitoring, predicting, and inhibiting the formation of scale in oil and gas systems. In one or more embodiments, the removal of scale is also addressed. In general, scale is an accumulation of mineral deposits. In the context of oil and gas system, scale (or accumulated mineral deposits) may obstruct fluid flow, e.g., in pipes, and degrade equipment integrity. In oil and gas wells, a number of factors contribute to the production of scale. A direct cause of scale in oil and gas wells is the use or production of hard water containing dissolved minerals such as calcium, magnesium, chloride, and sulfate. Temperature and pressure changes within such hard water may cause the minerals to precipitate out and subsequently accumulate on various equipment surfaces. Such minerals may also be present within oil or other fluids and accumulate on equipment surfaces via the same processes. Common scale compositions include calcium carbonate, barite, celestite, anhydrite, gypsum, iron sulfide, and halite, although mixtures are also possible. A number of techniques are known in the art for preventing scale formation and for removing scale, including the use of "antiscalant" chemicals, mechanical removal procedures involving high-pressure water or scraping, and water softening and filtration. The techniques known in the art are reactive and are applied in isolation to one another without considering their mutual interactions.

Methods and systems of the present disclosure integrate geochemical analysis of fluid samples that are obtained throughout the well, such as water and oil, with machine learning (ML) techniques for predicting scale formation. The well's general state of operation, configurable parameters, and history of scale formation or maintenance may also be considered. The result of integrating the geochemical analysis of fluid samples with the additional data from the well through machine learning techniques is a predicted scale formation that describes the likelihood of scale forming at one or more locations or surfaces within the well. The predicted scale formation may include a scale formation risk level for a plurality of types of scale. For each type of scale considered, a scale severity may be associated with the predicted scale formation that indicates how much (e.g., in the form of a rate, volume, mass, etc.) scale is likely to be formed. Based on the predicted scale formation, a recommended treatment including a chemical injection may be determined. In some embodiments, the predicted scale formation may includes the recommended treatments for each type of scale, and an estimate of each treatment's efficiency or effectiveness. In accordance with one or more embodiments, the configurable parameters of the well are adjusted based, at least in part, on the predicted scale formation such that the recommended treatment is executed.

The performance of the well may be continuously monitored and its state continuously adjusted according to the description above. Consequently, embodiments of the present disclosure are predictive and proactive rather than reactive. In addition, embodiments of the present disclosure may respond dynamically (for example, on a predetermined time scale) or in real-time (i.e., substantially simultaneously, or on short timescales such as within a few seconds, minutes, or hours) as conditions within the well change, and may offer continuous prevention and removal of scale build up. Moreover, embodiments of the present disclosure may provide treatment strategies that are unique to specific wells and their unique characteristics and operating conditions.

FIG. 1 shows a schematic diagram in accordance with one or more embodiments. More specifically, FIG. 1 illustrates a well (106) in the vicinity of a hydrocarbon reservoir ("reservoir") (102) located in a subsurface formation ("formation") (104). The formation (104) may include a porous formation that resides underground, beneath the surface of the earth ("surface") (108). In the case of the well (106) being a hydrocarbon well, the reservoir (102) may include a portion of the formation (104). The formation (104) and the reservoir (102) may include different layers (referred to as subterranean intervals or geological intervals) of rock having varying characteristics, such as varying degrees of permeability, porosity, capillary pressure, and resistivity. In other words, a subterranean interval is a layer of rock having approximately consistent permeability, porosity, capillary pressure, resistivity, and/or other characteristics. For example, the reservoir (102) may be an unconventional reservoir or tight reservoir in which fractured horizontal wells are used for hydrocarbon production. Generally, a "complex" reservoir may be any reservoir that exhibits physical characteristics or internal qualities which vary substantially on either spatial or temporal scales. In the case of the well (106) being operated as a production well, the well (106) may facilitate the extraction of hydrocarbons (or "hydrocarbon production," or simply "production" when appropriate based on context) from the reservoir (102).

The well (106) may include a wellbore (120). The wellbore (120) may include a bored hole that extends from the surface (108) into a target zone (i.e., a subterranean interval) of the formation (104) such as the reservoir (102). An upper end of the wellbore (120), terminating at or near the surface (108), may be referred to as the "up-hole" end of the wellbore (120), and a lower end of the wellbore, terminating in the formation (104), may be referred to as the "down-hole" end of the wellbore (120). The wellbore (120) can facilitate the transmission of various fluids. For example, the wellbore (120) can be used to circulate drilling fluids during drilling operations, transfer or "produce" the produced fluid (121) (e.g., hydrocarbons, water, etc.) from the subsurface to the surface (108) during production operations, and inject substances (e.g., water) into the formation (104) or the reservoir (102) during injection operations. Moreover, various monitoring devices can be disposed within the wellbore (120). Further, the wellbore can be used for the placement of monitoring devices (e.g., logging tools) into the formation (104) or the reservoir (102) during monitoring operations (e.g., during in situ logging operations).

In some embodiments, a casing (not shown) is installed in the wellbore (120). For example, the wellbore (120) may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In embodiments having a casing, the casing defines a central passage that provides a conduit for the transport of tools and substances through the wellbore (120). For example, the central passage may provide a conduit for lowering logging tools into the wellbore (120), a conduit for the flow of production (e.g., oil and gas) from the reservoir (102) to the surface (108), or a conduit for the flow of injection substances (e.g., water) from the surface (108) into the formation (104). In some embodiments, the well (106) includes production tubing installed in the wellbore (120). The production tubing may provide a conduit for the transport of tools and substances through the wellbore (120). The production tubing may, for example, be disposed inside casing. In such cases, the production tubing may provide a conduit for some or all of the produced fluid (121) (e.g., oil, gas, water) passing through the wellbore (120) and the casing.

In some implementations, the well (106) includes a wellhead (130). The wellhead (130) may include a rigid structure installed at the "up-hole" end of the wellbore (120), at or near where the wellbore (120) terminates at the Earth's surface (108). The wellhead (130) may include structures (called "wellhead casing hanger" for casing and "tubing hanger" for production tubing) for supporting (or "hanging") casing and production tubing extending into the wellbore (120). Produced fluid (121) may flow through the wellhead (130), after exiting the wellbore (120), including, for example, the casing and the production tubing. In some embodiments, the well (106) includes flow regulating devices that are operable to control the flow of substances into and out of the wellbore (120). For example, the well (106) may include one or more production valves (132) that are operable to control the flow of the produced fluid (121). For example, a production valve (132) may be fully opened to enable unrestricted flow of the produced fluid (121) from the wellbore (120), the production valve (132) may be partially opened to partially restrict (or "throttle") the flow of the produced fluid (121) from the wellbore (120), and production valve (132) may be fully closed to fully restrict (or "block") the flow of produced fluid (121) from the wellbore (120).

In some embodiments, the wellhead (130) includes a choke assembly. For example, the choke assembly may include hardware with functionality for opening and closing the fluid flow through pipes in the well (106). Likewise, the choke assembly may include a pipe manifold that may lower the pressure of fluid traversing the wellhead. As such, the choke assembly may include a set of high pressure valves and at least two chokes. These chokes may be fixed or adjustable or a mix of both. Redundancy may be provided so that if one choke has to be taken out of service the flow can be directed through another choke.

In some embodiments, the well (106) includes a well control system (126). The well control system (126) may control various operations of the well (106), such as well production operations, well completion operations, well maintenance operations, and reservoir monitoring, assessment and development operations. An example of a control system that may be used as a well control system (126) is a Supervisory Control and Data Acquisition (SCADA) system. A SCADA system includes functionality for device monitoring, data collection, and issuing of device commands. SCADA systems may provide local control at an oil and gas field as well as remote control from a control room or operations center. To emphasize that the SCADA system, or other well control system (126), may monitor and control the various field devices ("devices") of an oil and gas field, dashed lines connecting some of the oil and gas field devices to the well control system (126) are shown in FIG. 1. In some embodiments, the control system includes a computer system that is the same as or similar to that of the computer system depicted in FIG. 7 with its accompanying description. In some embodiments, pressure valves, chokes, and sensors (e.g., flow rate sensor (139), temperature sensor (138), and pressure sensor (136)) are communicatively coupled to the well control system (126).

In some embodiments, various control components and sensors are disposed down-hole along the wellbore (120). For example, in one or more embodiments, an inflow control valve (ICV) may be disposed along the wellbore. An ICV is an active component usually installed during well completion. The ICV may partially or completely choke flow into a well. Generally, multiple ICVs may be installed along the reservoir section of a wellbore. Each ICV is separated from the next by a packer. Each ICV can be adjusted and controlled to alter flow within the well and, as the reservoir depletes, prevent unwanted fluids from entering the wellbore. In addition, the control components and sensors may further include a subsurface safety valve (SSSV). The SSSV is designed to close and completely stop flow in the event of an emergency. Generally, an SSSV is designed to close on failure. That is, the SSSV requires a signal to stay open and loss of the signal results in the closing of the valve. In one or more embodiments, a permanent downhole monitoring system (PDHMS) (170) is secured downhole. The PDHMS (170) includes a plurality of sensors, gauges, and controllers to monitor subsurface flowing and shut-in pressures and temperatures. As such, a PDHMS (170) may indicate, in real-time, the state or operating condition of subsurface equipment and the fluid flow. In one or more embodiments, the PDHMS (170) may further measure and monitor temperature and pressure within the reservoir (102) as well as other properties not listed.

In some embodiments, the well (106) includes a surface pressure sensor (136) operable to sense the pressure of the produced fluid (121) flowing through the well (106) and its components after it exits the wellbore (120). The surface pressure sensor (136) may include, for example, a wellhead pressure sensor that senses a pressure of the produced fluid (121) flowing through or otherwise located in the wellhead (130), referred to as "wellhead pressure" ($P_{wh}$). In some embodiments, the well (106) includes a surface temperature sensor (138) operable to sense the temperature of the produced fluid (121) flowing through the well (106), after it exits the wellbore (120). The surface temperature sensor (138) may include, for example, a wellhead temperature sensor that senses a temperature of the produced fluid (121) flowing through or otherwise located in the wellhead (130), referred to as "wellhead temperature" ($T_{wh}$). In some embodiments, the well (106) includes a flow rate sensor (139) operable to sense the flow rate of the produced fluid (121) flowing through the well (106), after it exits the wellbore (120). The flow rate sensor (139) may include hardware that senses a flow rate of the produced fluid (121) ($Q_{wh}$) passing through the wellhead (130). In one or more embodiments the flow rate sensor (139) is a multiphase flow meter (MPFM). The MPFM monitors the flow rate of the produced fluid (121) by constituent. That is, the MPFM may detect the instantaneous amount of gas, oil, and water. As such, the MPFM indicates percent water cut (% WC) and the gas-to-oil ratio (GOR). Additionally, the MPFM may measure pressure and fluid density. The MPFM may further include, or make use of, the surface pressure sensor (136) and the surface temperature sensor (138).

In accordance with one or more embodiments, during operation of the well (106), the control system (126) collects and records well operation data (140) for the well (106). The well operation data (140) may include, for example, a record of measurements of wellhead pressure ($P_{wh}$) (e.g., including flowing wellhead pressure), wellhead temperature ($T_{wh}$) (e.g., including flowing wellhead temperature), wellhead volume flow rate ($Q_{wh}$) over some or all of the life of the well (106), and water cut data. The well operation data (140) may further include wellhead data regarding the choke assembly and data referring to the states of subsurface valve(s) (e.g., ICV), if any, and other sensor data collected and received by the PDHMS (170), including a record of measurements of reservoir properties like temperature and pressure.

In some embodiments, the measurements are recorded in real time and are available for review or use within seconds, minutes, or hours of the condition being sensed (e.g., the measurements are available within 1 hour of the condition being sensed). In such embodiments, the well operation data (140) may be referred to as "real-time" well operation data (140). Real-time well operation data (140) may enable an operator of the well (106) to assess a relatively current state of the well (106) and make real-time decisions regarding development of the well (106) and the reservoir (102), such as on-demand adjustments in regulation of the produced fluid (121) from the well.

The various valves, pressure gauges and transducers, sensors, and flow meters associated with (e.g., disposed on) a well may be considered devices of an oil and gas field. As described, these devices may be disposed both above and below the surface of the Earth. These devices are used to monitor and control components and sub-processes of an oil and gas field. It is emphasized that the plurality of oil and gas devices described in reference to FIG. 1 are non-exhaustive. Additional devices, such as electrical submersible pumps (ESPs) (not shown) may be present in an oil and gas field with their associated sensing and control capabilities. For example, an ESP may monitor the temperature and pressure of a fluid local to the ESP and may be controlled through adjustments to ESP speed or frequency.

In one or more embodiments, the well (106) includes a water treatment system (180). Water is frequently used (e.g., for injection) and sometimes abundantly produced at oil and gas wells. Water is often produced as a byproduct of oil and gas production operations due to its presence in the proximity of oil and gas reserves. Water may be used as a base fluid in drilling mud for cooling, lubrication, pressure control, and cuttings transport. In hydraulic fracturing, water is mixed with sand and chemicals and the mixtures are pumped into wells at high pressures creating new pathways for oil and gas to flow. Once drilling is complete, wells are often completed with casing and cementing, further involving water as a mixture with cement. Water may also be injected simply to displace oil to enhance production. The water treatment system (180) may be used to manage both injected and produced water within the well (106). In addition, the water treatment system (180) may be used to monitor components of the well (106) that come into contact with water. Monitoring of components of the well (106) that interact with water is important to predict, detect, and mitigate the production of scale or remove previously formed scale. As previously described, scale is a hard, crystalline deposit (e.g., mineral deposit) that forms on equipment surfaces that make contact with and other fluids containing dissolved minerals. Scale formation can occur due to a variety of factors, including the presence of minerals like calcium, magnesium, and sulfates in fluids, combined with specific operational conditions like temperature and pressure. The presence of scale can lead to reduced flow efficiency, blockages, increased energy usage, and a heightened risk of equipment failure.

In one or more embodiments, a water treatment system (180) is part of the well control system (126). As such, the water treatment system (180) may be communicatively coupled to many of the same devices and sensors accessible by the well control system (126). However, in other embodiments the water treatment system (180) may be substantially independent form the well control system (126). Thus, methods and system of the present disclosure relate to wells (106) that include independent water treatment systems (180) and water treatment systems that are part of well control systems (126). In either case, the water treatment system (180) may be communicatively coupled to the above-described sensors, pressure valves, gauges, and other devices.

In order to predict, detect, and prevent scale production in the well (106), the water treatment system (180) may be used to obtain samples of water or other fluids from various locations within the well (106), depending on where and how the fluids is being used. Geochemical data (185) may be measured from fluid samples using the water treatment system and may include measures of total dissolved solids (TDS), the levels of calcium, magnesium, chloride, sulfate, and pH. The water treatment system (180) may further measure properties of the fluid such as the fluid temperature and fluid pressure, which may relate to the production of scale. To measure temperature and pressure, the water treatment system (180) may make use of the temperature sensor (138) and pressure sensor (136), although the water treatment system (180) may also use different pressure and temperature sensors strategically located throughout the well (106). The water treatment system may include components for gravimetric analysis of fluid samples or for analyzing fluid conductivity. The former may provide more precise measurements of TDS and mineral levels while the latter may provide more rapid measurements of TDS and mineral levels. The water treatment system (180) may include a digital pH meter for measuring pH levels of fluids.

For preventing scale build up, the water treatment system (180) may inject chemicals in the proximity of the systems that interact with water. The injection of chemicals by the water treatment system (180) is defined by chemical injection parameters (190). The chemical injection parameters (190) may include defining the particular chemical that is injected. Many antiscalants (chemicals used to prevent scale build up) are known in the art, including inorganic polyphosphates, organic phosphate esters, organic phosphonates, and organic polymers. Though only a few antiscalants are described herein, a person of ordinary skill in the art will appreciate that the methods and systems of the present disclosure are not limited by the choice of antiscalant. Additional antiscalants not listed may be used without limitation. In addition to defining the antiscalant or combination of antiscalants used, the chemical injection parameters may further define the particular location or depth of injection, the timing of the injection, the volume of injected chemicals, and the rate of chemical injection. To perform injection of chemicals, the water treatment system (180) may be coupled in fluid communication with the well (106) and include storage containers for antiscalant chemicals as well as pumps such as ESPs.

In one or more embodiments, the water treatment system (180) may utilize mechanical rather than chemical techniques for preventing scale build up. Mechanical techniques that may be employed by the water treatment system (180) may include base-exchange water softening, whereby magnesium and calcium minerals are removed from water via ion-exchange, electromagnetic water softening, and reverse osmosis. Mechanical scale removal may include scraping and the usage of high-pressure water to physically remove scale from equipment surfaces. To this end, the water treatment system may include high-pressure water jets disposed throughout the well (106), automatic and manual scraping devices, water softening subsystems (e.g., a resin tank and a brine tank). The application or adjustment of one or more mechanical techniques applied to the well (106) by the water treatment system (180) may be defined by mechanical treatment parameters (195). For example, the mechanical treatment parameters may define a time, location, or duration of application of a high-pressure water jet.

The plurality of oil and gas devices described above may be distributed, local to the sub-processes and associated components, global, connected, etc. The devices may be accessed and adjusted by controllers of the well control system (126) and the water treatment system (180). A well controller and a water treatment controller may be of various control types, such as a programmable logic controller (PLC) or a remote terminal unit (RTU). For example, a programmable logic controller (PLC) may control valve states, pipe pressures, warning alarms, and/or pressure releases throughout the oil and gas field. In particular, a programmable logic controller (PLC) may be a ruggedized computer system with functionality to withstand vibrations, extreme temperatures, wet conditions, and/or dusty conditions, for example, around a well (106). With respect to an RTU, an RTU may include hardware and/or software, such as a microprocessor, that connects sensors and/or actuators using network connections to perform various processes in the automation system. As such, a distributed control system may include various autonomous controllers (such as remote terminal units) positioned at different locations throughout the oil and gas field to manage operations and monitor sub-processes. Likewise, a distributed control system may include no single centralized computer for managing control loops and other operations.

In review, and in accordance with one or more embodiments, a plurality of well devices are disposed throughout a well (106). A well device may be disposed below the surface (108), e.g., a component of the PDHMS (170), or located above the surface (108). Well devices disposed below the surface may further measure properties or characteristics of the reservoir (102). Generally, well devices can measure or sense a property, control a state or process of the well (106), or provide both sensory and control functionalities. For example, a state of a valve may include an indication of whether the valve is open or closed. In some instances, the state of a valve may be given by some percentage of openness (or closedness). As such, a well device, which may be the valve itself, can determine and transmit the state of the valve and therefore act as a sensor or sensory device. Further, a well device, which may be the valve itself, can alter or change the state of the valve by receiving a signal from the well control system (126). Sensed or measured properties of the well (106) are stored and/or collected as well operation data (140) for the well, regardless if the sensed or measured property was determined by a device of the PDHMS (170) or the well control system (126) or other device. Specific fluid properties, such as temperature, pressure, total dissolved solids, mineral content, and pH, are measured by the water treatment system (180) as geochemical data (185).

Operation of the well (106) may be controlled or dictated through one or more well operation parameters (145). The well operation parameters (145) may represent and/or prescribe an operational state of the devices of the well. Thus, in one or more embodiments, the well (106) is controlled through a well control system (126) that determines and transmits a command signal to the field devices of the well (106) according to the well operation parameters (145).

In one or more embodiments, the well (106) may be an injection well. The injection well injects, or places, a fluid into porous subsurface formations such as a reservoir. The injected fluid may be composed of brine, freshwater, steam, polymers, carbon dioxide, and other chemical agents. The injected fluid may be tailored to the subsurface formations and further account for the location of one or more production wells in an oil and gas field to displace and aid in the extraction of oil and gas. Accordingly, well operation parameters (145) for an injection well may include the composition of the injection fluid and its volume flow rate into the subsurface. When an oil and gas field is composed of more than one injection well, the well operation parameters (145) may further dictate a pattern injection strategy for the oil and gas field. The operation of injection may also be dictated by the chemical injection parameters (190) for the water treatment system in order to mitigate scale production or treat both the injected fluids and the fluids within the well (106) for other purposes.

In one or more embodiments, the well (106) may be a hydraulic fracturing well. In hydraulic fracturing, water, sand, and/or other chemicals may be injected into a well to break up underground bedrock and improve accessibility to oil and gas reserves. Again, the operation of a hydraulic fracturing well, as well as the composition of a fracturing fluid the processes driving its injection into the subsurface, are defined and controlled by well operation parameters (145) for the hydraulic fracturing well. Similar to other types of injection wells, the operation of injection in a hydraulic fracturing well may also be dictated by the chemical injection parameters (190) for the water treatment system in order to mitigate scale production or treat the injected fluids for other purposes.

Regardless of the type of well (106), the operation of the well (106) and specification of materials and processes associated with the operation well (106) are defined by the well operation parameters (145) for the well (106). Mechanical treatment parameters (195) and chemical injection parameters (190) for the water treatment system (180) define the operation of the water treatment system (180). Meanwhile, the well operation parameters (145) are monitored and can be adjusted by a well controller (not shown) associated the well control system (126), while the chemical injection parameters (190) and chemical injection parameters (190) are monitored and can be adjusted with a water treatment controller (not shown) associated with the water treatment system (180). Both the well control system (126) and the water treatment system (180) may be proximate the well (106) or they may be located at a remote location relative to the well (106).

Oil and gas field devices, like those shown in FIG. 1 (and others not shown), monitor and govern the behavior of the components and sub-processes of the oil and gas field. Therefore, the productivity of the oil and gas field (and the behavior of wells (106)) is directly affected, and may be altered, by the devices. Generally, complex interactions between oil and gas field components and sub-processes exist such that configuring field devices for optimal production is a difficult and laborious task. Further, the state and behavior of oil and gas fields is transient over the lifetime of the constituent wells requiring continual changes to the field devices to enhance production or enact other goals. The transient operating conditions of oil and gas fields including wells (106) create conditions that may have different effects on the formation of scale while imposing different levels of risk. Accordingly, treating and preventing scale build up must address the specific operating conditions of wells (106).

In one aspect, embodiments disclosed herein relate to a system for determining a predicted scale formation using a machine learning model taking into consideration the current state of the well as monitored by the plurality of sensors and devices communicatively coupled to the well control system and water treatment system. In accordance with one or more embodiments, the predicted scale formation is further used by a well controller and water treatment controller, to issue or transmit a digital or electronic signal or command to automatically, and in real-time, update or adjust the set of well operation parameters and chemical injection parameters to alter the behavior or state of the well according to a user-defined goal. For example, in one or more embodiments, the predicted scale formation may include a determination of the type of scale that may be produced as well as a treatment strategy to inhibit the growth of the determined scale type. Consequently, the command to the chemical injection parameters may be to adjust the injected chemicals to those that specifically affect the growth of scale of the determined type according to a recommended treatment. In one or more embodiments, the state of the well may be continuously monitored and processed by the machine learning model to repeatedly predict scale formation as the state of the well changes over time. In this way, the state of the well and the status of scale formation may be kept at an optimal level according to a predefined operation metric for the well, for example, keeping fluid flow rate within a specific pipe or plurality of pipes above a certain value.

In accordance with one or more embodiments, well data from the well are processed with a machine learning model to determine a prediction scale formation. Machine learning, broadly defined, is the extraction of patterns and insights from data. The phrases "artificial intelligence," "machine learning," "deep learning," and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning will be adopted herein, however, one skilled in the art will recognize that the concepts and methods detailed hereafter are not limited by this choice of nomenclature.

Machine learning (ML) model types may include, but are not limited to, neural networks, random forests, generalized linear models, and Bayesian regression. Further, as defined herein, ML may include algorithmic search methods and optimization methods such as a line search or the genetic algorithm. ML model types are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. The selection of hyperparameters surrounding a model is referred to as selecting the model "architecture." Generally, multiple model types and associated hyperparameters are tested and the model type and hyperparameters that yield the greatest predictive performance on a hold-out set of data is selected.

Figure 2:
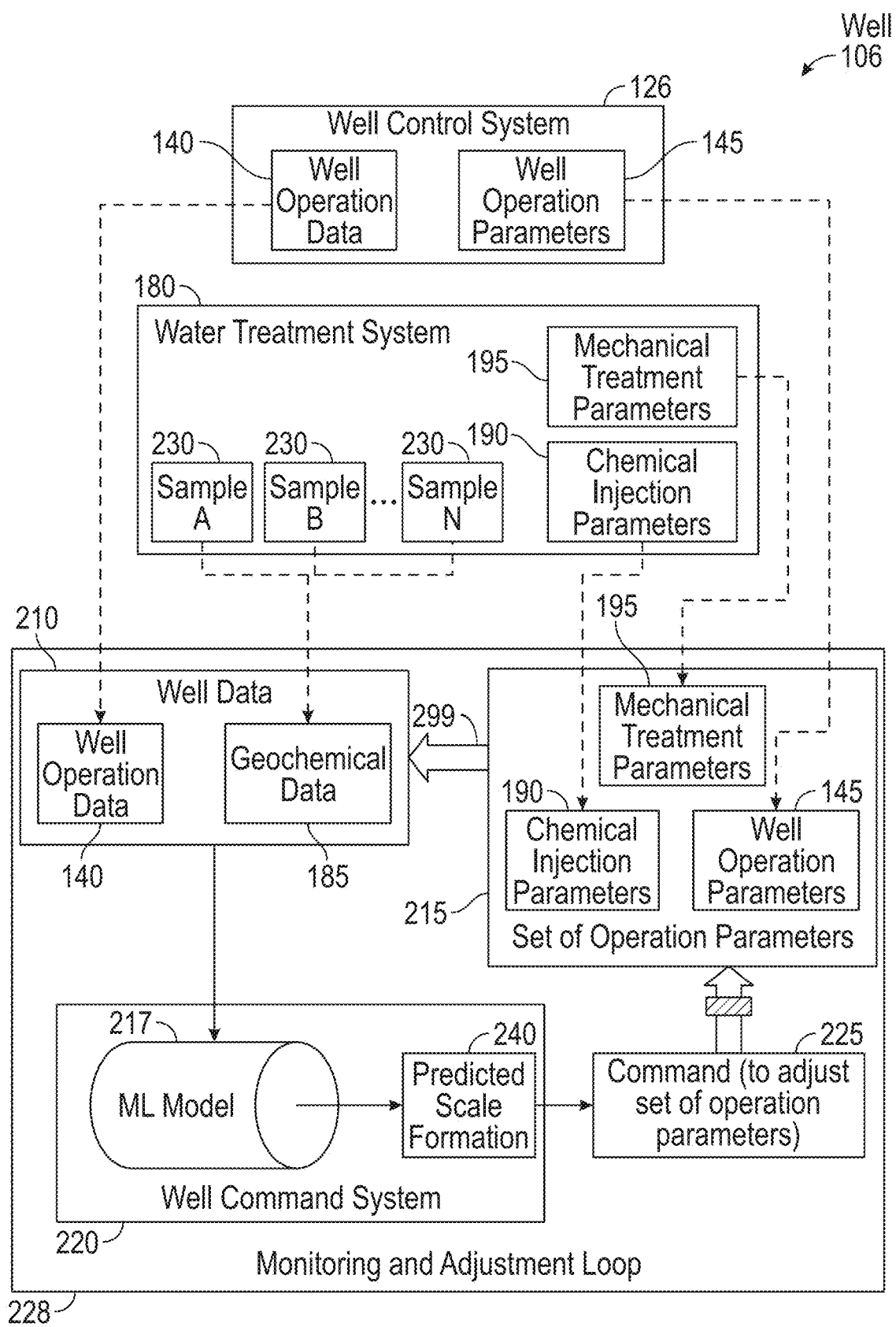
FIG. 2 depicts a well in accordance with one or more embodiments.

As noted, the objective of the ML model is to determine the predicted scale formation for a well. In accordance with one or more embodiments, FIG. 2 depicts the interactions between the ML model and different aspects of a well (106). FIG. 2 depicts a schematic diagram representing one possible embodiment of a well (106). Although a well (106) is also described above in FIG. 1, it is to be understood that the structures depicted in both FIG. 1 and FIG. 2 need not be identical although similar structural elements and components may be present in both. However, for concision and consistency, like-named elements may have names repeated to serve analogous or identical roles.

The well (106) of FIG. 2 includes a well control system (126), and the well control system (126) has associated with itself well operation data (140) and well operation parameters (145). In one or more embodiments, the well control system (126) controls various operations of the well (106), such as well production operations, well completion operations, well maintenance operations, and monitoring, assessment and development operations. In some embodiments, the well control system (126) includes a computer system that is the same as or similar to that of computer system depicted in FIG. 7 with its accompanying description. Several of the controllable devices typically associated well control systems (126) have been described in relation to FIG. 1.

In one or more embodiments, the well (106) of FIG. 2 also includes a water treatment system (180) that may or may not be part of the well control system (126). The water treatment system (180) controls water treatment within the well (106).

Figure 7:
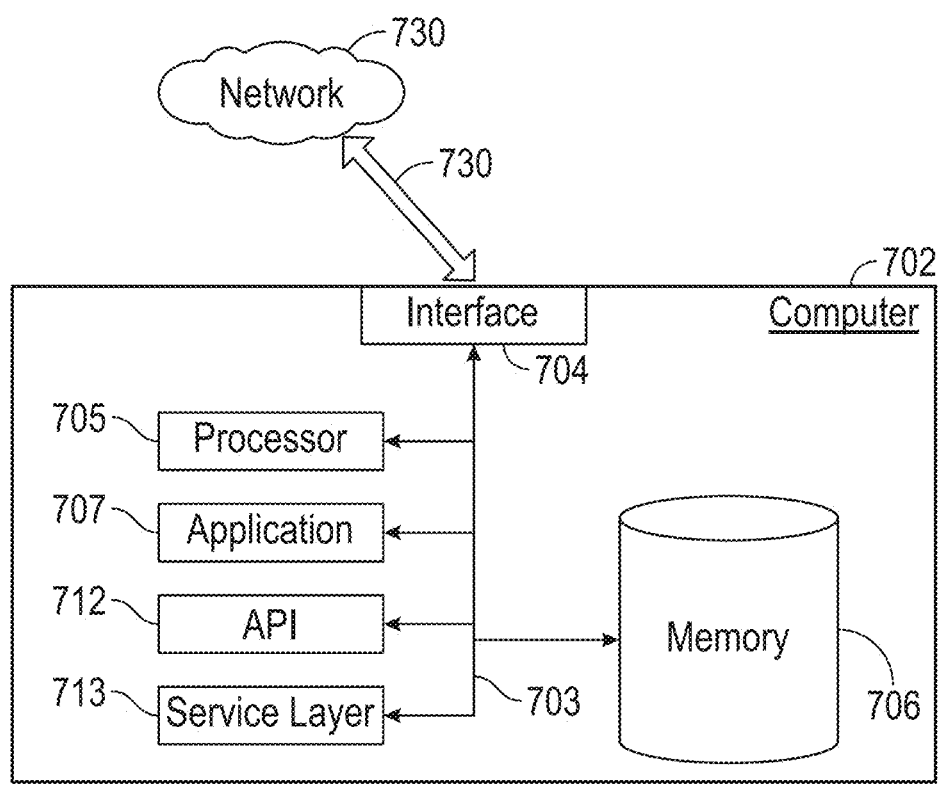
FIG. 7 depicts a system in accordance with one or more embodiments.

In some embodiments, the water treatment system (180) includes its own computer that is the same as or is similar to the of computer system depicted in FIG. 7 with its accompanying description. Several of the controllable devices typically associated water treatment systems (180) have been described in relation to FIG. 1. As depicted, the water treatment system obtains a plurality of fluid samples (e.g., sample A, sample B, up to and including sample N (230), where N is any number) from different locations within the well (106). The fluid samples (230) are used to measure geochemical data (185) pertaining to the fluids used throughout or produced by the well (106). The water treatment system (180) also has associated with itself chemical injection parameters (190) and mechanical treatment parameters (195). Accordingly, the water treatment system (180) is used to both monitor the properties of fluid that is produced and used within the well (106) and to enact changes to the fluid within the well (106), for example, by applying water softening techniques as defined by the mechanical treatment parameters (195) or injecting chemical substances as defined by the chemical injection parameters (190).

The well operation data (140) describes both dynamic and static properties as the well (106) as measured by the well control system (126), in accordance with one or more embodiments. For example, the well operation data (140) may include measurements of temperature, pressure, percent water cut (% WC), and gas-to-oil ratio (GOR) from one or more field devices disposed throughout the well. The well operation data (140) may further include frequency, speed, pressure, and temperature measurements from one or more electrical submersible pumps (ESPs), pressure readings from one or more pressure transducers, temperature measurements from one or more temperature sensors, and valve states. In addition, the well operation data (140) may include measurements of the well geometry, such as the wellbore radius, wellbore length (for horizontal wells), wellbore depth (for vertical wells) or other physical attributes such as the well completion skin factor or the layout and configuration of pipes within the well (106). The well operation data (140) may further include subsurface measurements from devices disposed within the well, such as wellbore flowing pressure. In one or more embodiments, the well operation data (140) further includes the production history and injection history of the wells of the oil and gas field, respectively, if present. In addition, the well operation data (140) may include a historical record of scale build-up within the well (106) that indicates the types of scale that have been present as well as its amount or severity. The well operation data (140) may also include a historical record of previous maintenance operations, including the type of maintenance performed, the date of the maintenance, and whether scale formation was addressed during the maintenance or not.

Regarding the geochemical data (185) corresponding to the fluid samples (230) obtained by the water treatment system (180), the geochemical data (185) describes the geochemical properties of the fluids. For example, the geochemical data (185) may include subsurface measurements of total dissolved solids, quantifying the combined content of all organic and inorganic substances dissolved in the fluids. The geochemical data (185) may also include the concentration of calcium, magnesium, chloride, sulfate, and other minerals associated with scale production. In addition, the geochemical data (185) may include a measure of the fluid acidity, or its pH level. In one or more embodiments, the water treatment system (180) repeatedly obtains fluid samples (230) such that the geochemical data (185) provides substantially current (or real-time) insight into the status of the well (106). For example, the water treatment system (180) may obtain fluid samples (230) on a predetermined timescale of every five minutes, every twenty minutes, every hour, every six hours, once per day, or on any other predetermined timescale. In addition, the water treatment system (180) may record all obtained geochemical data (185) to create a historical record of the geochemical properties of the fluids produced or used throughout the well (106).

In accordance with one or more embodiments, the well control system (126) is defined by well operation parameters (145). The well operation parameters (145) define and assign states to devices disposed within the well (106), which may include valves, such as production valve and inflow control valves near the surface, controllers of a permanent downhole monitoring system and associated devices, one or more tools for logging, one or more choke assemblies, and one or more electrical submersible pumps. The well operation parameters (145) may be adjusted and maintained via a well controller (not shown). The well controller may be a programmable logic controller (PLC) or a remote terminal unit (RTU).

The water treatment system may include chemical injection parameters (190) that define the injection of chemicals into the well (106). The chemical injection parameters (190) may primarily define the type of chemical that is injected. Typical antiscalant chemical types include phosphonates, polyacrylates, carboxylates, sulfonic acids, and other polymers. Antiscalant chemicals may be used in isolation or in combination with each other or other methods for water treatment. In addition, the chemical injection parameters (190) may define the amount of chemicals that are injected, their relative ratios, the timing of the injection, and the location of the injection. The water treatment system (180) may also include mechanical treatment parameters (195) that define aspects of mechanical procedures for removing or preventing scale build up. Mechanical procedures for preventing scale include applying abrasive materials or devices to equipment surfaces, such as abrasive wheels or discs, wire brushes, application of high velocity sand or water. Mechanical procedures may further involve performing reverse osmosis on fluid samples to remove dissolved ions and molecules and may also involve the application of water softening materials that use ion exchange with minerals associated with scale growth. Thus, the mechanical treatment parameters (195) may define the timing, duration, and location of performing reverse osmosis, water softening, or the application of an abrasive material. The water treatment system (180) may be controlled by the well controller described above in relation to the well control system (126), or it may be controlled by its own water treatment controller. The water treatment controller may also be a PLC or an RTU with the same capabilities as the well controller but directed towards controlling the functionality of the water treatment system (180). That is, the chemical injection parameters (190) and the mechanical treatment parameters (202) may be controlled by the water treatment controller.

As depicted in FIG. 2, data from the components well (106) are collected from the plurality of devices of the oil and gas field and are stored as well data (210). That is, the well data (210) contains all data gathered and measured from the various devices disposed within the well (201) as measured by the well control system (126) and the water treatment system (180). As such, the well data includes at least the well operation data (140) and the geochemical data (185). Similarly, configurable aspects, features, elements, or structures of the well (106), or more specifically, the well control system (126) and water treatment system (180), may be collectively stored as a set of operation parameters (215). In one or more embodiments, the set of operation parameters (215) includes the well operation parameters (145) of the well control system (126) in addition to the chemical injection parameters (190) and mechanical treatment parameters (195) of the water treatment system (180). One with ordinary skill in the art will appreciate that additional field devices ("devices") may be employed in a well (106) and that additional associated well data (210) may be collected without departing from the scope of this disclosure. Similarly, additional configurable devices beyond those listed may be included within the well (106) leading to additional parameters beyond those listed in the set of operation parameters (215), without limitation. For example, in one or more embodiments, the set of operation parameters (215) may further include drilling parameters defining the operation of a drilling system for wells that are not fully completed.

As has been established, aspects of the well (106) and its operation are defined by the state or values of parameters belonging to the set of operation parameters (215). That is, the set of operation parameters (215) directly influence measurements regarding the state of the well (106) or subcomponents of the well (106) that may be measured as well data (210). For example, well operation data (140) that includes measures of fluid pressure or temperature may be directly influenced by the values of well operation parameters (145) that define the state of choke valves and heating or cooling elements. As another example, geochemical data (185) that includes measures of fluid pH may be directly influenced by the values of the chemical injection parameters (190) that define the injection rate of chemicals. As yet another example, geochemical data (185) that includes a measure of total dissolved solids (TDS) may be directly influenced by mechanical treatment parameters (195) that define a mechanical procedure for removing scale, such as applying a water softening technique or water filtration technique that introduces or removes dissolved solids from the water.

To emphasize that the set of operation parameters (215) may directly influence the observed well data (210), a large arrow (299) is depicted in FIG. 2 pointing from the set of operation parameters (215) to the well data (210).

Continuing with FIG. 2, in accordance with one or more embodiments, the well data (210) are processed by a ML model (217). In one or more embodiments, the result of the ML model (217) is a predicted scale formation (240) for the well (106). As previously described, the predicted scale formation (240) may describe the likelihood or possibility of scale formation in a number of ways. For example, the predicted scale formation may quantify a scale formation risk level (e.g., in the form of a statistical likelihood or probability) for each type of scale that may form, as well as the associated severity (e.g., in the form of a rate or a quantity such as volume or mass) of scale formation for each type of scale. In addition, the predicted scale formation (240) may also include a recommended treatment for each type of scale and a prediction of the treatment efficiency. Thus, in accordance with one or more embodiments, the ML model (217) determines the predicted scale formation (240) based on, or accepting as inputs, the well data (210). As the well data (210) may include a number of elements (e.g., well operation data (140) and geochemical data (185)), the predicted scale formation may be generally thought of as a dependent upon multiple variables. In one or more embodiments, a recommended treatment is determined based on the predicted scale formation (240), and the recommended treatment includes a chemical injection using the water treatment system (180). In one or more embodiments, the recommended treatment includes a type of an antiscalant chemical and an amount of the antiscalant chemical for the chemical injection.

In one or more embodiments, the well data (210) and set of operation parameters (215), are continuously monitored by the plurality of devices that are disposed throughout the well (106) and communicatively coupled to the well control system and water treatment system (180). Accordingly, the predicted scale formation (240) may be determined at any given moment in time, or across a predefined interval of time (e.g., the predicted scale formation (240) may be determined every hour, every six hours, or across any desired timescale, up to and including timescales of days or weeks).

In accordance with one or more embodiments, the well data (210) and the set of operation parameters (215) may be pre-processed before being processed by the ML model (217). Pre-processing may include activities such as numericalization, filtering and/or smoothing of the data, scaling (e.g., normalization) of the data, feature selection, outlier removal (e.g., z-outlier filtering) and feature engineering. Feature selection includes identifying and selecting a subset of field data with the greatest discriminative power with respect to predicting the hydrocarbon production and lithium extraction. For example, in one embodiment, discriminative power may be quantified by calculating the strength of correlation between elements of the well data (210) and the predicted scale formation (240). Consequently, in some embodiments, not all of the field data need be passed to the ML model. Feature engineering encompasses combining, or processing, various field data to create derived quantities. The derived quantities can be processed by the ML model (217). For example, the well data (210) may be processed by one or more "basis" functions such as a polynomial basis function or a radial basis function. In some embodiments, the field data is passed to the ML model (217) without pre-processing. Many additional pre-processing techniques exist such that one with ordinary skill in the art would not interpret those listed here as a limitation on the present disclosure.

In one or more embodiments, the ML model (217) is part of a well command system (220). The well command system (220) is responsible for transmitting commands across the well (106), for example, to the well control system (126) and to the water treatment system (180). In accordance with one or more embodiments, the predicted scale formation (240) is transmitted in real-time, or with a predetermined time delay, over a distributed network or through a physical mechanism for data transfer such as fiber optic cables via the well command system (220). The well command system (220) may assume different forms according to one or more embodiments of the present disclosure. For example, the well command system (220) may be a computer, such as the computer described in relation to FIG. 7, equipped with a controller similar to those employed by the well control system (126) and water treatment system (180), such as an RTU or PLC. However, the well command system (220) need not be its own structure. For example, the well command system (220) may be included by the well control system (126) or the water treatment system (180). In addition, the well command system (220) may be integrated with the well controller associated with the well control system (126) and the water treatment controller associated with the water treatment system (180). In one or more embodiments, the well command system (220) need not be physically associated with the well (106). That is, in one or more embodiments, the well command system (220) may be physically proximate to the well (106) although in other embodiments the well command system (220) is physically distant from the well (106). Consequently, the well command system (220) may be used remotely to influence the operation of the well (106). The well command system (220) may also enable an operator to manually transmit commands throughout the well (106).

To reiterate, the ML model (217) processes the well data (210), which may or may not be pre-processed, to determine a predicted scale formation (240). Based on the predicted scale formation (240), the well command system (220) may be used (automatically, or manually by an operator) to transmit a signal or command (225) across the well (106) to adjust the values of parameters belonging to the set of operation parameters (215). Recall that the values of the parameters in the set of operation parameters (215) define several aspects of the well's (106) operation. In one or more embodiments, the command (225) is determined by an operator of the well (106). As previously described, the predicted scale formation (240) may describe the likelihood of scale formation in various forms, including as a scale formation risk level (or likelihood) for each type of scale, the severity of each type of scale, recommended treatments, and predicted treatment efficiency. The operator may choose one or more recommended treatments depending on the particular available resources at the well (106) or depending on one or more objectives of the well (106). In other embodiments, treatments are selected automatically according to pre-defined criteria, such as selecting the treatment with the greatest predicted treatment efficiency.

In one or more embodiments, the command is determined automatically by the well control system. If only one treatment is recommended, then the well command system (220) may simply adopt the recommendation. Consequently, the command (225) would update the set of operation parameters according to the single recommended treatment. If multiple treatments are recommended, then the well command system (220) may be configured to automatically select the treatment with the highest predicted treatment efficiency. In one or more embodiments, the well command system (220) may select multiple recommended treatments that are enacted substantially simultaneously or at the same time as one another. For example, one recommended treatment may be to perform mechanical removal of scale while another treatment may be to inject phosphonates, and these may be performed at the same time. Alternatively, or in addition, multiple recommended treatments may be performed in series, one after the other. In some embodiments, the well command system (220) may determine the command (225) automatically while also allowing an operator to alter the command (225) or issue additional commands.

As previously described, scale formation is caused by a variety of factors within wells (106), and wells are often unique and undergo specific operating conditions. Accordingly, the command (225) may take on a variety of forms depending on the well (106), the well data (210), and the set of operation parameters (215) which may be different from one well (106) to another and from one period of time and another. In each case, the command (225) is directed towards adjusting the values of one or more parameters in the set of operation parameters (215), for example, the chemical injection parameters (190), the mechanical treatment parameters (202), and the well operation parameters (145).

In adjusting the chemical injection parameters (190), the command (225) may be, for example, to inject phosphonates at a specific rate or with a specific timing interval, to interchange one injected chemical (e.g., polyacrylates) with another (e.g., carboxylates), or to inject one or more chemicals into a specific pipe of the well (106). In adjusting the mechanical treatment parameters (202), the command (225) may be, for example, to turn on or off a high-pressure jet of water for the removal of scale, turn on or off an automatic sander or scraping device, or to position one or more mechanical devices for the removal of scale. In adjusting the well operation parameters (145), the command may be, for example, to adjust the temperature or pressure within one or more pipes, redirect fluid or change the flow rate of fluid through one or more pipes by adjusting the positions of valves, or to slow or increase the rate of fluid extraction and injection. It is to be understood that the listed examples are given for illustrative purposes and are not to be considered limiting to the present disclosure. In addition, the command (225) is not limited to adjusting only a particular subset of the set of the operation parameters (215) (e.g., only the mechanical treatment parameters (195) or only the well operation parameters (145)). For example, the command (225) may be to first adjust the well operation parameters (145) to close a particular valve so that fluid stops flowing through a specific pipe. The same command (225) may also include adjusting the mechanical treatment parameters (202) to turn on a high-pressure jet of water to remove scale in the pipe that no longer has fluid flowing therethrough.

To emphasize that the command (225) to adjust the set of operation parameters (215) has a direct influence on the set of operation parameters (215), a large arrow is depicted in FIG. 2 that points from the command (225) to the set of operation parameters (215).

In one or more embodiments, the operation of the well (106) may be maintained as part of a monitoring and adjustment loop (228) in accordance with one or more embodiments. The monitoring and adjustment loop (228) includes repeating the steps of obtaining the well data (210) and the set of operation parameters (215), determining, a predicted scale formation based on the well data (210) using a machine learning model (217), and transmitting a command (225) to adjust the set of operation parameters based on the predicted scale formation (240). By design, the adjustment to the set of operation parameters inhibits or prevents the formation of scale or removes existing scale. Thus, the monitoring and adjustment loop (228) may be used to maintain the well (106) in a state of reduced scale formation, adapting to changes in the state of the well (106) and always predicting scale formation (240) based on up-to-date conditions.

An example iteration of the monitoring and adjustment loop (228) is provided as follows. As previously described, the predicted scale formation (240) may include providing a recommended treatment for one or more types of scale that may form. Accordingly, the command (225) to adjust the set of operation parameters (215) may be to adjust the set of operation parameters such that the recommended treatment is executed. An example may be a recommended treatment to inject a predetermined amount of phosphonates into a flowing fluid in the well (106). In such a case, the command (225) would be to adjust the set of operation parameters (215), or more specifically, the chemical injection parameters (190), to execute the injection of the predetermined amount of phosphonates. Injecting the phosphonates will inhibit scale growth within the well and therefore have a direct impact on the subsequently observed well data (210).

Therefore, in order to continuously inhibit scale growth, the well data (210) may be reevaluated and processed by the ML model (217). After processing the well data (210), the ML model (217) may determine a new predicted scale formation (240) including a new recommend treatment. In this case, the command (225) would then be to adjust the set of operation parameters to execute the new recommended treatment. The monitoring and adjustment loop (228) may continue in this way for a predetermined number of iterations or may be repeated after a length of time (i.e., may be implemented according to a predefined frequency or periodicity). A person of ordinary skill in the art will recognize that the above example is merely illustrative and is not limiting to the capabilities of the methods and systems of the present disclosure. During the monitoring and adjustment loop (228), the predicted scale formation (240) may vary resulting in a variety of recommended treatments and commands (225).

Figure 3:
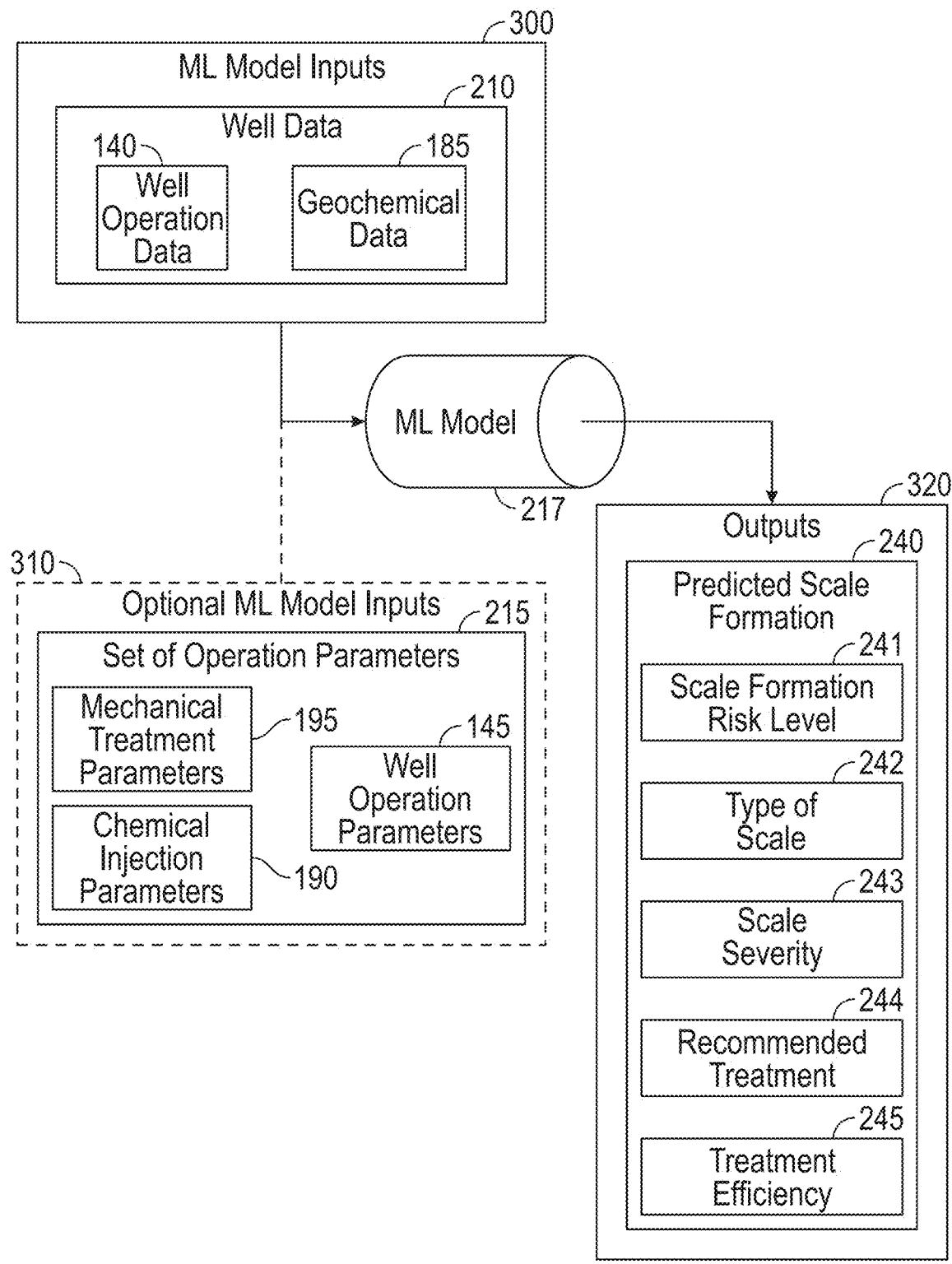
FIG. 3 depicts a system in accordance with one or more embodiments.

FIG. 3 depicts the use of the ML model (217) to process ML model inputs (300) to predict outputs (320) in accordance with one or more embodiments. In the embodiment depicted in FIG. 3, the ML model inputs (300) include the well data (210). The well data may include well operation data (140), and geochemical data (185). The well operation data (140) and geochemical data (185) have each been described in relation to FIGS. 1 and 2. As a result of processing the inputs (300), the ML model (217) determines the output (320), which in this case is predicted scale formation (240) for the well.

As previously described, the predicted scale formation (240) may include a scale formation risk level (241). The scale formation risk level (241) quantifies the likelihood (or probability) of scale forming under given the current state of the well as described by the well data (210) and the set of operation parameters (215). The scale formation risk level may also be a categorical descriptor that describes the probability of scale forming by providing a categorical label, for example, "high risk" or "low risk." However, different conditions within the well (e.g., different temperatures and pressures of fluid, as described by well operation data (140), or different minerals being present, as described by the geochemical data (185)) may foster the growth of different types of scale. Accordingly, the predicted scale formation (240) may also categorically describe the type of scale (242) that may be forming, where each type of scale (242) has its own scale formation risk level (241). In addition to the scale risk formation level (241), each type of scale (242) may also be characterized by a scale severity (243), which quantifies or categorically describes how much scale is likely to be formed or is currently forming, or how much scale may be present. As a quantified value, the scale severity (243) may describe a rate of scale formation, for example, as a measure of surface area, mass, or volume of scale formation per unit time. Alternatively, or in addition, the scale severity (243) may describe a total amount of scale formation over a preselected period of time. As a categorical value, the scale severity (243) may describe a rate or total amount of scale formation as belonging to a category such as "significant scale formation" or "insignificant scale formation," for example. In this way, the scale formation risk level (241), the type of scale (242), and the scale severity (243) may describe both individual types of scale as well as combinations of scale.

In one or more embodiments, a recommended treatment (244) including a chemical injection using the water treatment system is determined based on the predicted scale formation (240). Each type of scale (242) may respond differently or require different treatment strategies. Moreover, combinations of types of scale (242) may require unique approaches tuned for optimal inhibition or removal. Thus, the recommended treatment may be determined to specifically address the scale formation risk level (241), type of scale (242), and scale severity (243). In one or more embodiments, the predicted scale formation (240) includes the recommended treatment (244). That is, in such embodiments, the recommended treatment (244) is determined as part of the predicted scale formation (240). In one or more embodiments, the recommended treatment includes a type of an antiscalant chemical and an amount of the antiscalant chemical for the chemical injection.

As a basic example, a predicted scale formation (240) may show a high scale formation risk level (241) for a type of scale (242) such as calcium carbonate. Phosphonates are commonly used to treat water at risk of forming calcium carbonate scale. Accordingly, the recommended treatment (244) may be to inject an amount of phosphonates into the well (106), where the amount of phosphonates depends on the scale severity (243). In this simplified example, as it is well known that phosphonates are effective inhibitors of calcium carbonate scale, the treatment efficiency (245) of injecting phosphonates would be high. This example demonstrates how the predicted scale formation (240) may uniquely address different types of scale (242), each with different scale formation risk levels (241), scale severities (243), and treatment efficiencies (245).

Treatments that can be recommended as a recommended treatment (244) as output(s) (320) of the machine learning model (217) disclosed herein can include, but are not limited to, chemical treatments, mechanical treatments, thermal treatments, water softening treatments, electromagnetic treatments, and combinations thereof.

Chemical Treatments can include the designation and use of antiscalants, pH modifiers, and chelating agents. In general, antiscalants are chemicals used to prevent scale deposits by inhibiting the precipitation of scale-forming minerals. Common antiscalants include phosphonates, polyphosphates, and polymer-based inhibitors. pH modifiers adjust the pH of the water which can influence the solubility of minerals, thereby reducing scale formation. This might involve the addition of acids or bases to adjust the pH to levels that prevent mineral precipitation. Chelating agents are chemicals that bind with scale-forming minerals like calcium and magnesium, keeping them in solution and preventing them from crystallizing out as scale.

Mechanical Treatments can include high-pressure jetting, scraping, and vibrational techniques. In high-pressure jetting, high-pressure water jets are used to physically remove scale from surfaces of pipes and other equipment. In scraping, mechanical devices such as scrapers or brushes are used to physically remove scale buildup from within the pipelines. Vibrational techniques apply vibrations to break down scale mechanically without damaging the infrastructure.

Thermal techniques can include thermal shock where a rapid temperature change is applied to disrupt scale structure making it easier to remove. Water softening techniques can include ion exchange and reverse osmosis. In ion exchange scale-forming ions like calcium and magnesium are removed from the water and replaced with ions that do not form scale. Reverse osmosis is a process that uses a semipermeable membrane to remove scale-forming minerals from water by filtering them out. Electromagnetic treatments can include the application of electromagnetic fields to prevent the crystallization of minerals, thus inhibiting scale formation.

In one or more embodiments, the recommended treatment (244) further includes a schedule or an indication of a timeframe (e.g., within three weeks) that the recommended treatment should be implemented. Thus, the recommended treatment (244) can be said to include predictive maintenance scheduling where recommend maintenance operations are specified at optimal times based on the predicted scale risk, ensuring that treatments are applied before scale formation becomes problematic.

Finally, the recommended treatment (244) can include a modification of operation parameters (215) that control one or more aspects of the well and associated systems. For example, the recommended treatment (244) can indicate a modification of flow rates, pressure settings, or temperatures to alter the conditions that contribute to scale formation, based on elements of the output (320).

In one or more embodiments, the recommended treatment (244) is based on one or more of the scale formation risk level (241), type of scale (242), and scale severity (243). The recommended treatment (244) can be determined based on one or more of these quantities through execution of a risk assessment. That is, in the risk assessment, based on the prediction from the ML model (217), the risk level of scale formation is assessed to identify high-risk areas or conditions that are prone to scale development. Then, suitable treatments are considered taking into account the listed quantities and, in some cases, further considering a cost effectiveness of different treatments. Thus, the recommended treatments is customized to the specific needs and operational constraints of the well. In some embodiments, determination of a suitable treatment for recommendation involves combining different treatment methods for optimal effectiveness. In some embodiments, optimization algorithms are used to compare different treatment strategies and select the one that maximizes efficiency, minimizes cost, and aligns with environmental and safety standards.

As an example, a recommended treatment (244) can differ based on a determination of whether a predicted scale formation (240) is a low-risk or a high-risk setting. In the context of managing scale formation in oil and gas operations, the approach to inhibition can differ significantly between low-risk and high-risk settings. These differences are primarily due to the urgency of intervention required, the potential for damage or disruption, and the cost-effectiveness of preventative versus reactive strategies. A comparison of how recommended treatments may differ between a low-risk and a high-risk setting are given as follows.

Low-Risk Setting:
  Frequency of Treatments: In low-risk settings, treatments can be applied less frequently since the likelihood of scale formation is lower. This reduces operational costs and interference with normal operations.
  Type of Treatments: The treatments in low-risk areas might are more conservative or represent less intensive methods, such as mild chemical treatments or periodic water softening processes. For example, the recommended use of antiscalants can be at a maintenance dose rather than at higher, more aggressive dosages.
  Monitoring Intensity: Monitoring in low-risk settings can be less frequent. While still utilizing real-time data for ongoing assessment, the intervals between detailed inspections or comprehensive data analyses can be extended.
  Operational Adjustments: Minor adjustments in operational parameters, such as slight changes in water chemistry or temperature adjustments, can suffice to maintain a low risk of scale formation.
  Cost Consideration: Spending on scale prevention in low-risk areas is typically lower, focusing on cost-effective and minimal interventions to maintain the status quo without overinvesting in scale management.

High-Risk Setting:
  Frequency of Treatments: High-risk areas require more frequent and sometimes more immediate interventions to prevent rapid scale buildup that could lead to severe operational disruptions.
  Type of Treatments: Aggressive and multi-faceted treatment strategies are often necessary in high-risk settings. This may include the use of powerful chemical inhibitors, combined mechanical and chemical treatments, and advanced methods like electromagnetic treatment if the scale type is particularly resistant or damaging.
  Monitoring Intensity: Continuous, real-time monitoring with immediate response capabilities is important in high-risk settings. The system needs to be highly responsive to any signs of scale buildup to initiate treatments without delay.
  Operational Adjustments: Significant modifications might be needed in operational parameters, such as reducing flow rates, adjusting pressures, or altering temperatures strategically to mitigate scaling risks. These adjustments are often more complex and dynamically managed based on continuous data inputs.
  Cost Consideration: The cost implications are higher in high-risk areas, but these costs are justified by the potential for significant operational disruption and equipment damage that proactive scale management can prevent.

Both low-risk and high-risk settings benefit from the use of predictive analytics to forecast scale formation risks, as described herein. However, in high-risk settings, the predictive model outputs are important for immediate decision-making, while in low-risk settings, they may guide more gradual strategy adjustments. That is, in high-risk settings, the decision-making process is more likely to be automated with predefined triggers for certain actions based on specific data thresholds. In contrast, in low-risk settings, manual oversight and decision-making can be more prevalent, with a focus on longer-term trends rather than immediate data fluctuations.

By tailoring the scale inhibition strategies according to the risk level systems and methods described herein ensure that resources are allocated efficiently, operational disruptions are minimized, and scale management is optimized to meet the specific needs of each operational environment.

The recommended treatments described herein differ from conventional systems because the recommended treatments are based on an integration of machine learning with real-time geochemical and operational data. In general, traditional scale management often relies on scheduled treatments based on historical data and standard industry practices without specific real-time data input. These might include regular dosing with chemicals based on average conditions over time. Whereas systems and methods described herein use advanced machine learning algorithms to analyze real-time operational and geochemical data, predict scale formation risks before they become problematic, and dynamically adjust treatment plans. This allows for preemptive management that is highly specific to the immediate conditions and trends observed in the well.

A benefit of the tailored recommended treatments developed in accordance with one or more embodiments is that the recommended treatments are more environmentally friendly compared to treatment selection through traditional methods. In particular, methods and systems disclosed herein allow for precision dosing of chemicals, customized chemical selection, a reduction in chemical usage due to real-time monitoring and adjustment, and ensure compliance with environmental regulations. Using one or more outputs (320) of the ML model (217) precise dosing of chemicals can be determined such that chemicals are used only when necessary and in the exact amounts required, minimizing the overuse of chemicals. Further, the most effective and least environmentally harmful chemicals for the specific types of scale predicted can be selected (e.g., automatically), reducing the reliance on broad-spectrum chemicals that may have greater ecological impacts.

In one or more embodiments, the predicted scale formation (240) that is an output (320) of the ML model (217) may include a scale formation risk level (241) marginalizing over all types of scale (242) that may form. In such a case, the scale formation risk level (241) describes the likelihood for scale of any type to form, and likewise for the scale severity (243), recommended treatment (244), and treatment efficiency (245). Table 1 below provides an example dataset where the ML model (217) has output a predicted scale formation (240) including a scale formation risk level (241) for a plurality of fluid samples characterized by geochemical data (185). The scale formation risk level (241) in Table 1 refers to the categorical likelihood any type of scale forming.

pH, concentration of calcium ions in mg/L, concentration of magnesium ions in mg/L, concentration of sulfate ions in mg/L, concentration of bicarbonate ions in mg/L, and concentration of chloride ions in mg/L. Each sample has been processed by the ML model (217) and a scale formation risk level (241) has been determined, which in this case is a categorical variable including low risk, medium risk, and high risk. The scale formation risk level (241) is given in the final column.

In one or more embodiments, the ML model (217) may also process optional ML model inputs (310) alongside the ML model inputs (300). The optional ML model inputs (310) include the set of operation parameters (215), where the set of operation parameters (215) may include well operation parameters (203), mechanical treatment parameters (202), and chemical injection parameters (190). As previously described, the well data (210) may be directly influenced by the values of parameters within the set of operation parameters (215). As such, the well data (210) may be strongly correlated with parameters of the set of operation parameters (215) such that knowledge of one (e.g., the well data (210)) provides knowledge of the other (e.g., the set of operation parameters (215)). However, a strongly correlated relationship between the set of operation parameters (215) and the well data (210) is not guaranteed. In some instances, the well data (210) and set of operation parameters (215) may be only weakly correlated such that rela-

TABLE 1

Geochemical data (185) for a plurality of fluid samples and the resulting scale formation risk level (241) of each sample as determined by the ML model (217).

| Sample ID | TDS (mg/L) | pH | $Ca^{2+}$ (mg/L) | $Mg^{2+}$ (mg/L) | $SO_4^{2-}$ (mg/L) | $HCO_3^-$ (mg/L) | $Cl^-$ (mg/L) | Scale formation risk level |
|---|---|---|---|---|---|---|---|---|
| Sample-X | 149400 | 5.75 | 8341 | 1022 | 833 | 113.5 | 78348 | High |
| Sample-Y | 148580 | 5.79 | 8764 | 1075 | 908 | 117.5 | 78079 | High |
| Sample-01 | 90000 | 7 | 500 | 300 | 250 | 200 | 40000 | Medium |
| Sample-02 | 45000 | 7.5 | 200 | 150 | 100 | 150 | 20000 | Low |
| Sample-03 | 130000 | 6 | 7000 | 900 | 800 | 100 | 70000 | High |
| Sample-04 | 135000 | 6.2 | 6500 | 850 | 750 | 120 | 65000 | High |
| Sample-05 | 80000 | 7.2 | 450 | 280 | 230 | 190 | 38000 | Medium |
| Sample-06 | 50000 | 7.8 | 220 | 160 | 120 | 160 | 22000 | Low |
| Sample-07 | 120000 | 6.5 | 6800 | 880 | 770 | 110 | 68000 | High |
| Sample-08 | 85000 | 7.1 | 480 | 290 | 240 | 180 | 39000 | Medium |
| Sample-09 | 55000 | 7.6 | 210 | 140 | 110 | 155 | 25000 | Low |
| Sample-10 | 140000 | 6.1 | 7500 | 920 | 810 | 105 | 72000 | High |
| Sample-11 | 75000 | 7.3 | 460 | 270 | 220 | 195 | 37000 | Medium |
| Sample-12 | 40000 | 7.9 | 190 | 130 | 90 | 165 | 18000 | Low |
| Sample-13 | 115000 | 6.7 | 6900 | 860 | 760 | 115 | 66000 | High |
| Sample-14 | 70000 | 7.4 | 440 | 260 | 210 | 185 | 35000 | Medium |

In the example provided by the data of Table 1, each sample has associated geochemical data (185). The geochemical data (185) in this example includes columns, from left to right, for total dissolved solids (TDS) measured in mg/L, tionship between one and the other is unclear, or the two may be totally uncorrelated. Therefore, in some embodiments, the ML model (217) directly considers the optional ML model inputs (310), such as the set of operation parameters, alongside the ML model inputs (300) to determine the outputs (320), including the predicted scale formation (240). Providing optional ML model inputs (310), such as the set of operation parameters (215), may also enhance the quality of recommended treatments (244) determined by the ML model (217).

Figure 4:
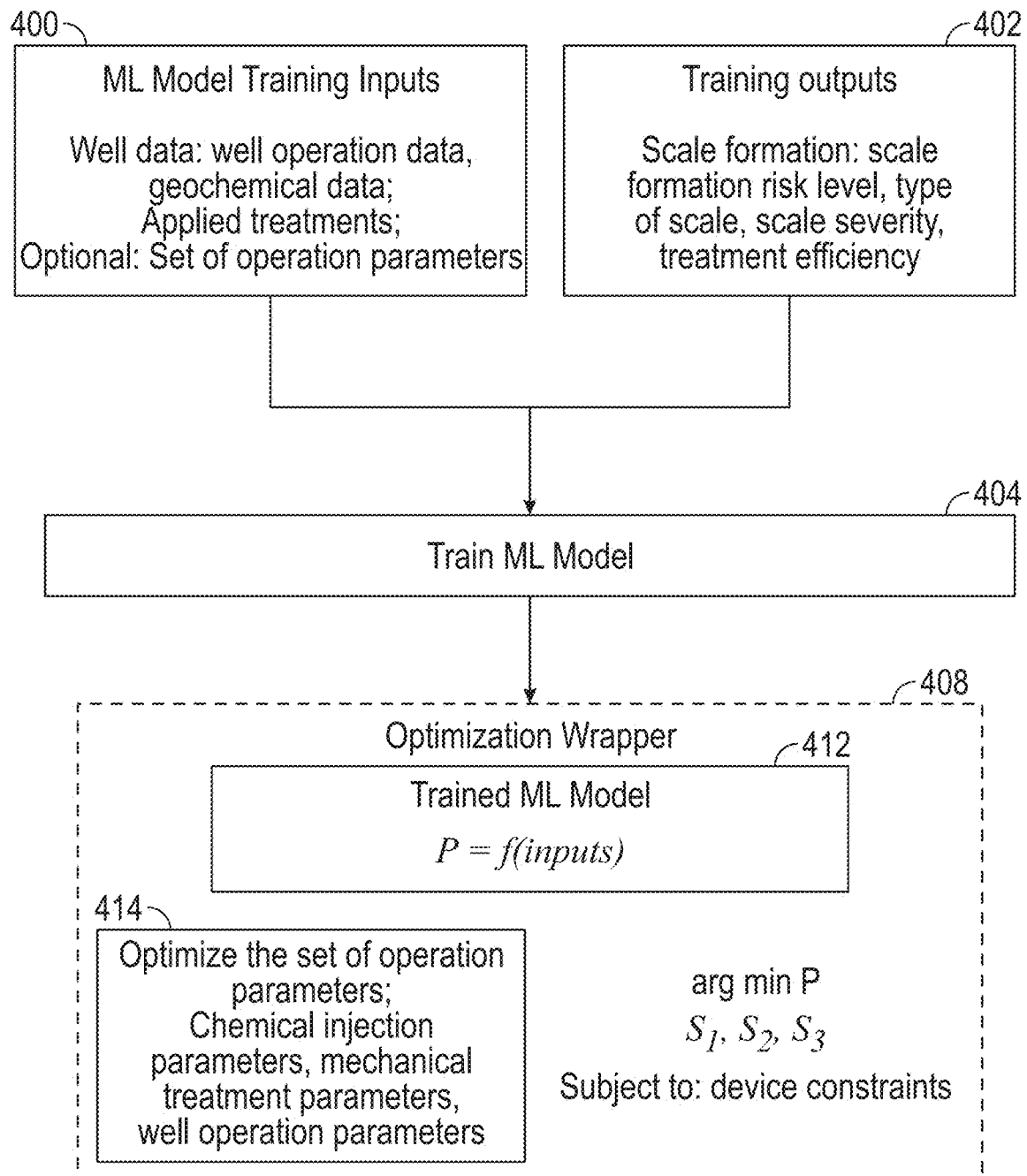
FIG. 4 depicts a system in accordance with one or more embodiments.

FIG. 4 depicts an embodiment of training the machine learning (ML) model. The ML model may be of any ML model type known in the art. In some embodiments, multiple ML model types and/or architectures may be used in combination or interchangeably. Generally, the ML model type and architecture with the greatest performance on a set of hold-out data is selected. Greater detail surrounding the training procedure for an ML model will be provided below in the context of a neural network. However, generally, training an ML model involves processing data to develop a functional relationship between elements of the data. In one or more embodiments, the ML model is trained using previously acquired, or historic, modelling data. At training (404), the modelling data is partitioned into ML model training inputs (400) and training outputs (402). The result of the training procedure is a trained ML model (412). The trained ML model (412) may be described as a function relating the inputs (400) and the outputs (402). That is, the ML model may be mathematically represented as outputs=$f$ (inputs), such that given an input (400) the ML model may produce an output (402).

ML model training (404) inputs (400) resemble the type of data the ML model may actually be exposed to during deployment, for example, when being used within a well to inhibit the production of scale. The training outputs (402) correspond to a "ground-truth" or known values that correspond to conditions represented by the ML model training inputs (400). For example, the ML model training inputs (400) may include well data such as well operation data and geochemical data for a particular well. Accordingly, the associated training outputs (402) may include measured values relating scale formation for the same well under the conditions described by the well operation data and geochemical data used as input. Thus, the ML model is trained (404) to determine the mapping between the ML model training inputs (400), which in this case is the well data, and the training outputs (402), which in this case includes measured values of scale formation. Consider another example. As described previously, during deployment, the ML model may determine recommended treatments for inhibiting scale growth. During training (404), a ML model input (400) may include well operation data, geochemical data, and a record of different applied treatments. The corresponding training outputs (402) may therefore include a record of treatment efficiency to guide the ML model (404) towards more useful treatment techniques. Generally, the ML model training inputs (400) and training outputs (402) are collected over a period of time from the well or may be acquired from analogous wells.

In one or more embodiments, the trained ML model (412), upon processing an input (400), produces an output (402), namely a predicted scale formation (P). As previously described, the predicted scale formation may include a scale formation risk level for each type of scale as well as the severity of the scale that may form. The predicted scale formation may also indicate how the scale may respond to various treatments, or a treatment efficiency. In addition, recall that many of the inputs (400) may be directly influenced by the set of operation parameters of the well (for example, applying an antiscalant treatment may affect the geochemical data of the well). As has been established, the objective of applying the ML model is to lower the formation of scale within the well, either through mitigation, inhibition, or removal. Accordingly, the output (402), or predicted scale formation (P), may be used to inform a change in the set of operation parameters to have achieve the mitigation, inhibition, or removal of scale. In practice, after training (404), an optimization wrapper (depicted as Block 408) may be used on the trained AI model to invert the model to optimize the set of operation parameters (414). That is, the optimizer or optimization wrapper may be used to access the ML model, in view of the set of operation parameters, to determine an optimal set of operation parameters that optimize a particular operation metric of the well. After optimization, the command to adjust the set of operation parameters would then include adjusting the set of operation parameters (414) to the optimal set of operation parameters.

An operation metric of the well may be defined to specifically address scale formation. In this case, the optimal set of operation parameters would be those that lead to the smallest amount of scale formation. As a more specific example, assuming scale severity is an output (402) of the ML model, then optimizing the set of operation parameters (414) would involve finding the set of operation parameters that minimize the scale severity. Scale growth or formation may also be treated indirectly by defining an operation metric, for example, as the rate of fluid flow through a pipe through which water (or another fluid) commonly flows, or the rate of produced fluid (e.g., oil or gas). In this case, scale growth would lower the rate of fluid flow within the well, and the optimal set of operations parameters would be, by definition of the operation metric, those that improve fluid flow or fluid production. Achieving the optimal fluid flow or rate of produced fluid, in this case, may require inhibiting scale growth or formation which may be achieved through appropriate adjustment of the set of operation parameters. Thus, as depicted in FIG. 3 and FIG. 4, an optional input to the ML model may be the set of operation parameters such that during optimization, the ML model has sufficient information to determine the impact of the set of operation parameters on the observed well data (or inputs (400)) and consequently the predicted scale formation (or outputs (402)).

Mathematically, the optimization may take the form:

$$\arg\min_{S_1, S_2, S_3} P \qquad (1)$$

subject to: device constraints, where the quantity P, the predicted scale formation is determined using the trained ML model (412). In this case, it is assumed that the predicted scale formation includes at least the scale formation risk level or the scale severity. Further, in EQ. 1, the chemical injection parameters are denoted as $S_1$, the chemical treatment parameters are denoted as $S_2$, and the well operation parameters are denoted $S_3$, and collectively $S_1$, $S_2$, and $S_3$ may be part of the set of operation parameters. Thus, the optimization wrapper (408) minimizes the predicted scale formation over the set of operation parameters, which may include the chemical injection parameters, the mechanical treatment parameters, and the well operation parameters. The optimization may alternatively be expressed as a maximization, for example, a maximization of produced fluid or of fluid flow. One with ordinary skill in the art will appreciate that maximization and minimization may be made equivalent through simple techniques such as negation. As such, the choice to represent the optimization as a maximization as shown in EQ. 1 does not limit the scope of the present disclosure. Whether done through minimization or maximization, the optimization wrapper (408) identifies the set (or sets) of operation parameters that optimize one or more predefined operation metrics.

A well may be subject to constraints, such as safety limits imposed on various devices and sub-processes. For example, it may be determined that in order for a well to operate safely, pressure, as measured by a given field device, should not exceed a prescribed value. In FIG. 4, the constraints are referenced as device constraints. In one or more embodiments, the well data may be monitored by a well control system (126) (e.g., SCADA system) such that device and process limits are monitored and controlled by the control system. The optimization wrapper (408) cannot elect any set of operation parameters that cause any portion of the well to exceed pre-defined device constraints. Additional examples of constraints applied to the optimization may include predefined maximum allowable chemical injection rates, production volume ratios, or maximum amount of time applying a mechanical treatment. In this way, a limit may be imposed on the amount of chemicals that may be injected, for example, in order to find the optimize the set of operation parameters (414) such that chemicals are not used in excess. Embodiments of the instant disclosure further allow for distributed decision making. For example, decisions regarding the modification of different parameters may be made independent of each other, for example, applying a mechanical treatment and a chemical treatment. In one or more embodiments, decision-based constraints and distributed decision strategies are accounted for during optimization (e.g., through constraints of the decoupling or independence of various operation parameters and lithium extraction configuration parameters.)

Figure 5:
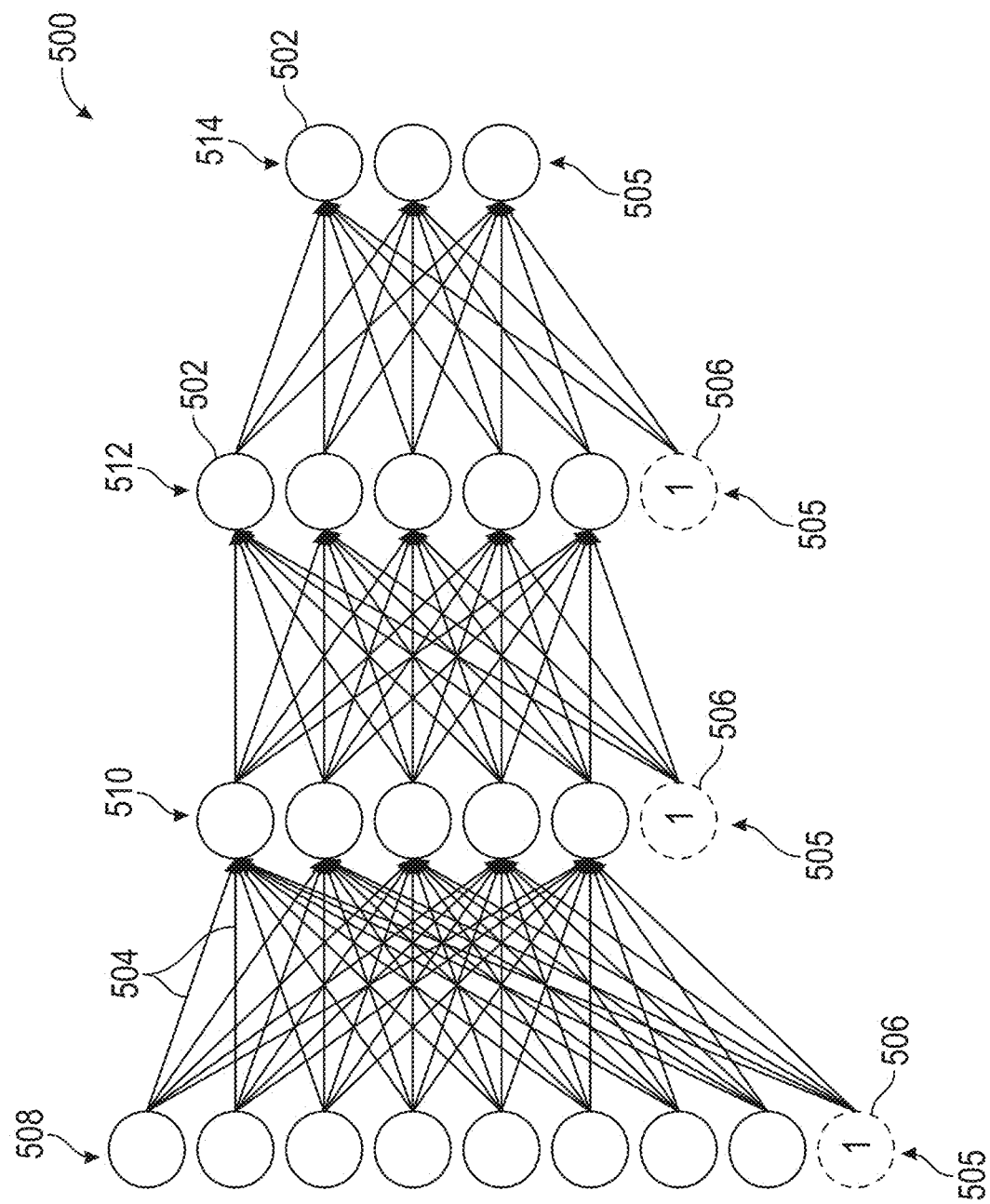
FIG. 5 depicts a neural network in accordance with one or more embodiments.

In accordance with one or more embodiments, the ML model discussed herein may be an artificial neural network ("neural network"). A diagram of a neural network is shown in FIG. 5. At a high level, a neural network (500) may be graphically depicted as being composed of nodes (502), where here any circle represents a node, and edges (504), shown here as directed lines. The nodes (502) may be grouped to form layers (505). FIG. 5 displays four layers (508, 510, 512, 514) of nodes (502) where the nodes (502) are grouped into columns, however, the grouping need not be as shown in FIG. 5. The edges (504) connect the nodes (502). Edges (504) may connect, or not connect, to any node(s) (502) regardless of which layer (505) the node(s) (502) is in. That is, the nodes (502) may be sparsely and residually connected. A neural network (500) will have at least two layers (505), where the first layer (508) is considered the "input layer" and the last layer (514) is the "output layer." Any intermediate layer (510, 512) is usually described as a "hidden layer". A neural network (500) may have zero or more hidden layers (510, 512) and a neural network (500) with at least one hidden layer (510, 512) may be described as a "deep" neural network or as a "deep learning method." In general, a neural network (500) may have more than one node (502) in the output layer (514). In this case the neural network (500) may be referred to as a "multi-target" or "multi-output" network.

Nodes (502) and edges (504) carry additional associations. Namely, every edge is associated with a numerical value. The edge numerical values, or even the edges (504) themselves, are often referred to as "weights" or "parameters." While training a neural network (500), numerical values are assigned to each edge (504). Additionally, every node (502) is associated with a numerical variable and an activation function. Activation functions are not limited to any functional class, but traditionally follow the form:

$$A = f\left(\sum_{i \in (incoming)} [(\text{node value})_i \, (\text{edge value})_i]\right), \quad (2)$$

where i is an index that spans the set of "incoming" nodes (502) and edges (504) and $f$ is a user-defined function. Incoming nodes (502) are those that, when viewed as a graph (as in FIG. 5), have directed arrows that point to the node (502) where the numerical value is being computed. Some functions for $f$ may include the linear function $f(x)=x$, sigmoid function $$f(x) = \frac{1}{1 + e^{-x}},$$

and rectified linear unit function $f(x)=\max(0, x)$, however, many additional functions are commonly employed. Every node (502) in a neural network (500) may have a different associated activation function. Often, as a shorthand, activation functions are described by the function $f$ by which it is composed. That is, an activation function composed of a linear function $f$ may simply be referred to as a linear activation function without undue ambiguity.

When the neural network (500) receives an input, the input is propagated through the network according to the activation functions and incoming node (502) values and edge (504) values to compute a value for each node (502). That is, the numerical value for each node (502) may change for each received input. Occasionally, nodes (502) are assigned fixed numerical values, such as the value of 1, that are not affected by the input or altered according to edge (504) values and activation functions. Fixed nodes (502) are often referred to as "biases" or "bias nodes" (506), displayed in FIG. 5 with a dashed circle.

In some implementations, the neural network (500) may contain specialized layers (505), such as a normalization layer, or additional connection procedures, like concatenation. One skilled in the art will appreciate that these alterations do not exceed the scope of this disclosure.

As noted, the training procedure for the neural network (500) comprises assigning values to the edges (504). To begin training the edges (504) are assigned initial values. These values may be assigned randomly, assigned according to a prescribed distribution, assigned manually, or by some other assignment mechanism. Once edge (504) values have been initialized, the neural network (500) may act as a function, such that it may receive inputs and produce an output. As such, at least one input is propagated through the neural network (500) to produce an output. Recall, that a given data set will be composed of inputs and associated target(s), where the target(s) represent the "ground truth," or the otherwise desired output. In accordance with one or more embodiments, the input of the neural network (500) is the well data, which may include well operation data and geochemical data. In other embodiments, the input of the neural network may also include the set of operation parameters. The corresponding outputs or target is the predicted scale formation, where the predicted scale formation may include a scale formation risk level for each type of scale, scale severity, recommended treatments, and predicted treatment efficiencies.

During training, the neural network (500) output is compared to the associated input data target(s). For example, in a training scenario, real measured scale formation values (e.g., scale severities or treatment efficiencies) are compared with predicted scale formation values based on the ML model inputs (i.e., the well data and optionally the set of operation parameters). The comparison of the neural network (500) output to the target(s) is typically performed by a so-called "loss function;" although other names for this comparison function such as "error function," "misfit function," and "cost function" are commonly employed. Many types of loss functions are available, such as the mean-squared-error function, however, the general characteristic of a loss function is that the loss function provides a numerical evaluation of the similarity between the neural network (500) output and the associated target(s). The loss function may also be constructed to impose additional constraints on the values assumed by the edges (504), for example, by adding a penalty term, which may be physics-based, or a regularization term. Generally, the goal of a training procedure is to alter the edge (504) values to promote similarity between the neural network (500) output and associated target(s) over the data set. Thus, the loss function is used to guide changes made to the edge (504) values, typically through a process called "backpropagation."

While a full review of the backpropagation process exceeds the scope of this disclosure, a brief summary is provided. Backpropagation consists of computing the gradient of the loss function over the edge (504) values. The gradient indicates the direction of change in the edge (504) values that results in the greatest change to the loss function. Because the gradient is local to the current edge (504) values, the edge (504) values are typically updated by a "step" in the direction indicated by the gradient. The step size is often referred to as the "learning rate" and need not remain fixed during the training process. Additionally, the step size and direction may be informed by previously seen edge (504) values or previously computed gradients. Such methods for determining the step direction are usually referred to as "momentum" based methods.

Once the edge (504) values have been updated, or altered from their initial values, through a backpropagation step, the neural network (500) will likely produce different outputs. Thus, the procedure of propagating at least one input through the neural network (500), comparing the neural network (500) output with the associated target(s) with a loss function, computing the gradient of the loss function with respect to the edge (504) values, and updating the edge (504) values with a step guided by the gradient, is repeated until a termination criterion is reached. Common termination criteria are: reaching a fixed number of edge (504) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (504) values are no longer intended to be altered, the neural network (500) is said to be "trained."

Methods and systems of the present disclosure may include additional types of machine learning models, such as a generative adversarial network (GAN). A detailed description of a GAN exceeds the scope of this disclosure. However, in summary, a GAN is generally composed of two machine-learned models that interact cyclically and are configured to perform opposing tasks. The two component machine-learned models of a GAN are typically called a generator and a discriminator. In general, the task of the generator is to produce a data object (e.g., geochemical data) such that the generated object is indiscernible from a "real," or non-generated data object. The task of the discriminator is to determine if a given data object is real or if the given data object was produced by the generator. Thus, these tasks may be said to be in opposition (i.e., adverse or adversarial) because the generator is tasked to produce a data object that cannot be distinguished from a real data object by the discriminator while the discriminator is specifically tasked to identify data objects generated by the generator. As with the machine learning models previously described, the generator and discriminator of a GAN (each a machine-learned model in itself) are parameterized by a set of weights (or edge values) that must be learned during training.

The training process of a GAN possesses unique characteristics. Training a GAN consists of determining the weights that minimize a given loss function, however, the loss function is typically split into two parts, namely, a reconstruction loss and an adversarial loss. Reconstruction loss quantifies the differences between real and generated data that is meant to embody the characteristics present in the real data without reference to the discriminator. Adversarial loss quantifies the ability of the discriminator to determine how closely the probability distributions of one or more properties present in the proposed image resemble the probability distribution of the same one or more properties in real data. During training, the generator receives input-target pairs and seeks to minimize the reconstruction loss and the adversarial loss. Typically, the generator is trained for a fixed number of iterations (e.g., fixed number of data examples, fixed number of data batches, fixed number of epochs, etc.) or until reaching a stopping criterion. Subsequently, the discriminator is given an assortment of real data objects and some data objects generated with the generator. It is noted that the label, or target, of the data objects processed by the discriminator during training is known. The adversarial loss is used to guide and update the weights of both the discriminator and the generator. In other words, guided by the adversarial loss, the weights of the generator are updated to produce a data object that cannot be distinguished from a real (or original) data object by the discriminator. Again, use of the adversarial loss to update the discriminator and the generator may be applied for a fixed number of iterations (e.g., fixed number of data examples, fixed number of data batches, fixed number of epochs, etc.) or until reaching a stopping criterion. In some instances, the process of training the generator and the generator and discriminator as guided by the reconstruction loss and the adversarial loss, respectively, is repeated cyclically until the discriminator can no longer distinguish between real and fake data objects due to the realism of the data objects produced by the generator. Typically, once trained, the discriminator of a GAN is discarded and the generator is used to generate data objects with sufficient realism.

Embodiments of the present disclosure may make use of GANs to create synthetic, or simulated, geochemical data using real geochemical data obtained by the water treatment system. The simulated geochemical data can then be used for training additional machine learning models, such as neural networks (or other model types, such as a decision tree, or random forest) for predicting scale formation.

Methods and systems of the present disclosure may make use of deep reinforcement learning. A detailed description of a reinforcement learning (RL) and deep RL (DRL) exceeds the scope of this disclosure. RL algorithms are used to determine a "policy" for selecting actions based on different observed states within an environment. Preferred actions are learned through the use of "rewards" which quantify the utility of states, actions, or combinations of states and actions. DRL algorithms are generally similar to RL algorithms but use deep neural networks (i.e., neural networks with at least one hidden layer) to model the decision-making policy. In both RL and DRL, updating the policy is guided by sampling actions from the space of possible actions and updating the policy based on the outcome of the action in terms of the reward. In this way, a model can be constructed such that for each observed state, actions that lead to rewards are selected and those that do not are avoided. In one or more embodiments, the reward function may be defined as the inverse of total scale produced, or the inverse of the probability of scale production. An observed state may be defined by the recorded well operation data or geochemical data, or any other aspect of well data. Allowable actions may include adjusting any member of the set of operation parameters, such as the mechanical treatment parameters, chemical injection parameters, or well operation parameters. As different states are explored and different actions are sampled, the DRL algorithm trains the neural network to identify treatments that minimize the total scale produced or minimize the probability of scale production thus achieving the greatest reward.

To further elucidate the innovative aspects of using Generative Adversarial Networks (GANs) and Deep Reinforcement Learning (DRL) in the context of managing scale formation in oil and gas operations, a description of how these technologies specifically contribute to improving the predictive and operational capabilities of such systems is given as follows. GANs can generate realistic synthetic geochemical data that mimic a wide range of possible scenarios which might not be fully represented in historical data. This capability is particularly useful in areas where data is scarce or in simulating rare events like extreme scale formation conditions. Further, a GAN can be used to augment existing datasets to improve the robustness and accuracy of the predictive models by filling in gaps in data and providing a more comprehensive training dataset. In general, data generated using a GAN can be used to test the resilience and accuracy of the scale prediction models under various hypothetical conditions. This helps in identifying potential weaknesses in the model and in understanding how the model might behave under different or extreme operational conditions. As such, by training the model with data that covers a broader range of conditions, including synthetically generated ones, the system described herein can adapt more dynamically to changing conditions in real time, enhancing the prediction accuracy and reliability. Further, GANs enable operators to perform risk assessments and contingency planning based on simulated data, providing a strategic advantage in managing scale formation proactively.

Deep Reinforcement Learning (DRL) can be used to optimize the sequence and combination of scale prevention treatments over time, learning from past actions and their outcomes to suggest operational adjustments that maximize the long-term efficiency and effectiveness of scale management. Unlike traditional models, DRL can continuously learn and update its strategies based on ongoing operations and outcomes, making the scale management system more intelligent and responsive over time. The use of DRL enables methods and systems disclosed herein to not only predict scale formation but also dynamically adjust to the predicted scale formation in real-time, optimizing operational parameters continuously based on the learned policy. Further, by defining rewards directly linked to operational efficiency metrics (such as minimal downtime, reduced chemical usage, or optimal flow rates), DRL aligns the operational goals directly with scale management strategies.

The novel integration of both GANs and DRL represents a synergistic approach where GANs enhance the training and robustness of the DRL models by providing diversified, realistic scenarios for training. The DRL models, in turn, use these scenarios to refine and optimize their decision-making strategies, ensuring that the system is well-prepared for a wide range of conditions. This combined approach not only increases efficiency and accuracy but also significantly advances the technological capabilities in scale management, providing a proactive, adaptive, and highly efficient system that could set new standards in the industry. Such integration represents a major leap forward from traditional reactive models, marking a significant innovation in the field.

Figure 6:
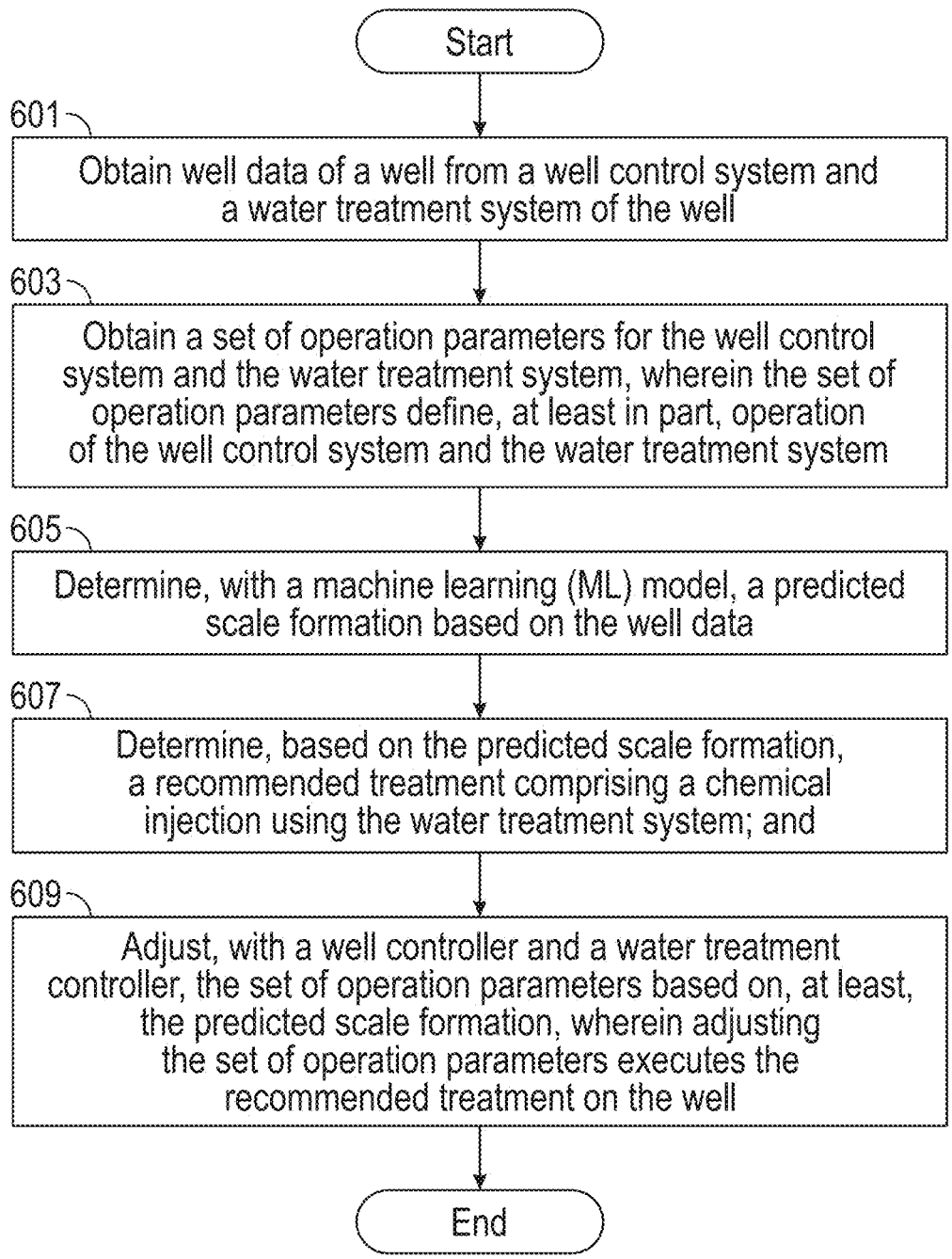
FIG. 6 depicts a flowchart in accordance with one or more embodiments.

The process of evaluating well data and predicting scale formation is summarized in the flow chart of FIG. 6. In Block 601, well data may be obtained from a well control system and a water treatment system of the well. Well data may include both well operation data, including measurements obtained by the well control system, and geochemical data, including measurements obtained by the water treatment system. The well operation data may describe both dynamic and static properties as the well, as measured by the well control system. Examples of well operation data may include measurements of temperature, pressure, percent water cut (% WC), gas-to-oil ratio (GOR), frequency, speed, pressure, and temperature measurements from one or more electrical submersible pumps (ESPs), pressure readings from one or more pressure transducers, temperature measurements from one or more temperature sensors, valve states, measurements of the well geometry, such as the wellbore radius, wellbore length (for horizontal wells), wellbore depth (for vertical wells) and other physical attributes such as the well completion skin factor or the layout and configuration of pipes within the well. In one or more embodiments, the well operation data further includes the production history and injection history of the well, a historical record of scale build-up within the well that indicates the types of scale that have been present as well as its amount or severity, a historical record of previous maintenance operations, including the type of maintenance performed, the date of the maintenance, and whether scale formation was addressed during the maintenance or not.

The geochemical data may describe the geochemical properties of fluid samples obtained by the water treatment system. For example, the geochemical data may include subsurface measurements of total dissolved solids, the concentration of calcium, magnesium, chloride, sulfate, and other minerals associated with scale production, a measure of the fluid acidity, or its pH level. In one or more embodiments, the water treatment system repeatedly obtains fluid samples such that the geochemical data provides substantially current (or real-time) insight into the status of the well (e.g., on a timescale of every five minutes, every twenty minutes, every hour, every six hours, once per day, or on any other predetermined timescale). The geochemical data may also include a historical record of the geochemical properties of the fluids produced or used throughout the well.

In one or more embodiments, the well data are pre-processed. Pre-processing may include numericalizing the data, scaling the data, selecting features from the data, and engineering features from the data.

In Block 603, a set of operation parameters that control the operation of the well control system and water treatment system may be obtained. The set of operation parameters may include well operation parameters defining the operation of the well control system in addition to mechanical treatment parameters and chemical injection parameters that define the operation of the water treatment system. The well operation parameters may include defining, for example, the extent to which one or more inflow or production valves within the well is open or closed. Modifying the states of the well operation parameters may be necessary for one or more operations at the well, such as for an injection operation, production operation, or maintenance operation.

The mechanical treatment parameters define the operation of mechanical procedures for removing or preventing scale growth. Mechanical procedures for preventing scale include applying abrasive materials or devices to equipment surfaces, such as abrasive wheels or discs, wire brushes, application of high velocity sand or water. Mechanical procedures may further involve performing reverse osmosis on fluid samples to remove dissolved ions and molecules and may also involve the application of water softening materials that use ion exchange with minerals associated with scale growth. the chemical injection parameters may include defining the injection of chemicals for the purpose of removing or preventing scale growth.

The chemical injection parameters may primarily define the type of chemical that is injected. Typical antiscalant chemical types include phosphonates, polyacrylates, carboxylates, sulfonic acids, and other polymers. Antiscalant chemicals may be used in isolation or in combination with each other or other methods for water treatment. In addition, the chemical injection parameters may define the amount of chemicals that are injected, their relative ratios, the timing of the injection, and the location of the injection. Both the well control system and water treatment system may interact with the plurality of devices disposed within the well and reservoir.

In Block 605, a predicted scale formation may be determined based on the well data the field data using a machine learning (ML) model. Various embodiments of the ML model have been described, for example, in FIGS. 5 and 6. The ML model outputs a prediction of the scale formation given the well data. The predicted scale formation may describe the possibility of scale production in various ways. For example, the predicted scale formation may include a scale formation risk level, which may be a continuous variable quantifying a likelihood or probability of scale formation or a categorical variable. The predicted scale formation may also indicate which types of scale may form or are currently forming as well as the severity of each type of scale. The scale severity may be quantified as a rate or bulk quantity (e.g., a mass or a volume).

In Block 607, a recommended treatment including a chemical injection using the water treatment system may be determined based on the predicted scale formation. As previously described, scale of a variety of types may form in the well. Different types of scale respond differently and sometimes require different treatment strategies. In addition, combinations of types of scale may require unique approaches tuned for optimal inhibition or removal. Thus, a recommended treatment may be determined to specifically address one or more aspects of the predicted scale formation, for example, the scale formation risk level, type of scale, or the scale severity. In one or more embodiments, the predicted scale formation includes the recommended treatment. That is, in such embodiments, the recommended treatment is determined as part of the predicted scale formation. are determined at the same time. In one or more embodiments, the recommended treatment includes a type of an antiscalant chemical and an amount of the antiscalant chemical for the chemical injection.

In Block 609, a well controller and water treatment controller are used to adjust the set of operations parameters are adjusted to new values according to the predicted scale formation. Depending on the goal at the well, the adjustment of the set of operation parameters may be different. In some instances, an operation metric may be used to inform the adjustment of the set of operation parameters. An operation metric of the well may be defined to specifically address scale formation. In this case, the set of operation parameters would be adjusted to values that lead to the smallest amount of scale formation. Scale growth or formation may also be treated indirectly by defining an operation metric to be, for example, the rate of fluid flow through a pipe through which water commonly flows, or the rate of produced fluid (e.g., oil or gas). In this case, scale growth would lower the rate of fluid flow within the well, and the set of operations parameters would be adjusted to values that improve fluid flow or fluid production. Any such adjustment may be performed automatically and autonomously, or may be done manually, or may be checked by a "human-in-the-loop."

The steps depicted in FIG. 6 may be repeated arbitrarily numerous times, in accordance with one or more embodiments. In other words, the steps depicted in FIG. 6 may be repeated to obtain new predictions of the predicted scale formation and different adjustments to the set of operation parameters for the well as its conditions change over time via natural geophysical occurrences as well as through interactions with the well. New predictions of the scale formation may include new recommended treatments, and by repeatedly executing the steps of FIG. 6, the methods and systems of the present disclosure may continuously inhibit scale growth.

Embodiments of the present disclosure may provide at least one of the following advantages. Embodiments of the present disclosure combine machine learning algorithms with comprehensive geochemical analysis to predict and prevent scale buildup and may also be used to remove scale. The described model provides predictive insights into the likelihood of scale formation based on geochemical data and operational parameters and thus provides more information than a binary prediction of whether or not scaling will occur. Embodiments of the present disclosure are capable of determining risk levels of scale formation associated with different water samples as either continuous or categorical variables (or both) offering a probabilistic understanding of the state of the well. Embodiments of the present disclosure are capable of identifying which produced fluid samples have a higher risk of scaling, considering various factors like water cut percentage and geochemical values for both different locations of the well and different moments in time. This risk assessment may be, in some aspects, advisory and may be used to guide well operators on where to focus scale prevention efforts and how to adjust treatment strategies. By evaluating risk levels, embodiments of the present disclosure may provide recommendations of the most appropriate preventive measures, providing a tool for informed decision-making rather than a simple predictor of (or device for measuring) scale formation.

Embodiments of the present disclosure combine machine learning predictions with detailed geochemical analysis, providing a comprehensive understanding of the fluid sample chemistry and potential for scale formation. The machine learning methods can identify complex patterns and correlations indicative of scale risks in multidimensional parameter space that may be difficult to otherwise determine. At the same time, the machine learning methods rely on geochemical analysis that provides a straightforward connection between the processed well data and the model outputs of the predicted scale formation and recommended treatments. Accordingly, methods and systems of the present disclosure offer enable exploiting the difficult and complex correlations while also providing a robust understanding of how the variables interact. Based on the predictive analysis, embodiments of the present disclosure may provide tailored and unique strategies or recommendations for scale prevention and control. These strategies are specifically designed to suit the unique geochemical profile of each site and operating conditions of the well, ensuring more effective and efficient scale management. Embodiments of the present disclosure also enable proactive management of scaling issues. By predicting scale formation before it occurs, early intervention may be taken thus preventing the scale-related issues that disrupt operations and lead to high maintenance costs. By effectively managing scale, the embodiments of the present disclosure may improve a variety of operation metrics, such as the flow efficiency in pipelines and other equipment, thereby prolonging operational life and reducing the need for frequent maintenance and chemical treatments.

Embodiments of the present disclosure are capable of minimizing the reliance on harsh chemical treatments. As has been discussed, a number of possible treatments are made possible by the adjustment of the set of operation parameters, for example, adjustment of the mechanical treatment parameters or chemical injection parameters. In addition, recall that one or more constraints may be placed on the machine learning model during an optimization stage. Such a constraint may include limiting the total amount, or rate, of chemical injection. In this way, embodiments of the present disclosure may align with environmental sustainability goals and reduce potential harm to ecosystems.

Embodiments of the present disclosure primarily rely on structures, devices, and sensors already present at most wells. Accordingly, embodiments of the present disclosure are capable of being easily integrated with existing operational systems in oil and gas facilities.

Embodiments may be implemented on a computer system. FIG. 7 is a block diagram of a computer system (702) used to provide computational functionalities associated with described algorithms, methods, functions, processes, flows, and procedures as described in the instant disclosure, according to one or more embodiments. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device such as an edge computing device, including both physical or virtual instances (or both) of the computing device. An edge computing device is a dedicated computing device that is, typically, physically adjacent to the process or control with which it interacts. For example, the AI model may be implemented on an edge computing device in order to quickly provide optimal sets of transceiver parameters and well operation parameters to associated devices or their controllers.

Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). The memory may be a non-transitory computer readable medium. For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
    obtaining well data of a well from a well control system and a water treatment system of the well;
    obtaining a set of operation parameters for the well control system and the water treatment system, wherein the set of operation parameters define, at least in part, operation of the well control system and the water treatment system;
    determining, with a machine learning (ML) model, a predicted scale formation based on the well data;
    determining, based on the predicted scale formation, a recommended treatment comprising a chemical injection using the water treatment system, wherein the recommended treatment further comprises a thermal shock treatment; and
    adjusting, with a well controller and a water treatment controller, the set of operation parameters based on, at least, the predicted scale formation,
    wherein adjusting the set of operation parameters executes the recommended treatment on the well.

2. The method of claim 1, wherein the well data comprises well operation data for the well control system and geochemical data for the water treatment system, and wherein the geochemical data comprises measurements of total dissolved solids for a plurality of water samples obtained by the water treatment system.

3. The method of claim 1, wherein the set of operation parameters comprises chemical injection parameters for the water treatment system and well operation parameters for the well control system.

4. The method of claim 1, wherein the predicted scale formation comprises the recommended treatment.

5. The method of claim 1, wherein the recommended treatment comprises a type of an antiscalant chemical and an amount of the antiscalant chemical for the chemical injection.

6. The method of claim 1, further comprising:
    determining, using an optimizer accessing the ML model in view of the set of operation parameters, a set of optimal operation parameters that optimize an operation metric of the well,
    wherein adjusting the set of operation parameters comprises adjusting the set of operation parameters to the set of optimal operation parameters.

7. A system, comprising:
    a well control system comprising a well controller;
    a water treatment system comprising a water treatment controller;
    wherein a set of operation parameters define, at least in part, operation of the well control system and the water treatment system;
    a plurality of sensors communicatively coupled to the well control system and the water treatment system, the plurality of sensors configured to obtain well data of a well; and
    a computer configured to:
        receive the well data and the set of operation parameters;
        determine, with a machine learning (ML) model, a predicted scale formation based on the well data;
        determine, based on the predicted scale formation, a recommended treatment comprising a chemical injection using the water treatment system, wherein the recommended treatment further comprises a thermal shock treatment; and adjust, with the well controller and the water treatment controller, the set of operation parameters based on, at least, the predicted scale formation, wherein adjusting the set of operation parameters executes the recommended treatment on the well.

8. The system of claim 7, wherein the set of operation parameters comprises chemical injection parameters for the water treatment system and well operation parameters for the well control system.

9. The system of claim 7, wherein the predicted scale formation comprises the recommended treatment.

10. The system of claim 7, wherein the recommended treatment comprises a type of an antiscalant chemical and an amount of the antiscalant chemical for the chemical injection.

11. The system of claim 7, wherein the computer is further configured to:
  determine, using an optimizer accessing the ML model in view of the set of operation parameters, a set of optimal operation parameters that optimize an operation metric of the well,
  wherein adjusting the set of operation parameters comprises adjusting the set of operation parameters to the set of optimal operation parameters.

12. A non-transitory computer-readable memory comprising computer-executable instructions stored thereon that, when executed on a processor, cause the processor to perform steps comprising:
  receiving well data of a well from a well control system and a water treatment system of the well;
  receiving a set of operation parameters for the well control system and the water treatment system, wherein the set of operation parameters define, at least in part, operation of the well control system and the water treatment system;
  determining, with a machine learning (ML) model, a predicted scale formation based on the well data;
  determining, based on the predicted scale formation, a recommended treatment comprising a chemical injection using the water treatment system, wherein the recommended treatment further comprises a thermal shock treatment; and
  adjusting, with a well controller of the well control system and a water treatment controller of the water treatment system, the set of operation parameters based on, at least, the predicted scale formation,
  wherein adjusting the set of operation parameters executes the recommended treatment on the well.

13. The non-transitory computer-readable memory of claim 12, wherein the well data comprises well operation data for the well control system and geochemical data for the water treatment system, and wherein the geochemical data comprises measurements of total dissolved solids for a plurality of water samples obtained by the water treatment system.

14. The non-transitory computer-readable memory of claim 12, wherein the set of operation parameters comprises chemical injection parameters for the water treatment system and well operation parameters for the well control system.

15. The non-transitory computer-readable memory of claim 12, wherein the predicted scale formation comprises the recommended treatment.

16. The non-transitory computer-readable memory of claim 12, wherein the recommended treatment comprises a type of an antiscalant chemical and an amount of the antiscalant chemical for the chemical injection.

17. The non-transitory computer-readable memory of claim 12, wherein the steps further comprise:
  determining, using an optimizer accessing the ML model in view of the set of operation parameters, a set of optimal operation parameters that optimize an operation metric of the well,
  wherein adjusting the set of operation parameters comprises adjusting the set of operation parameters to the set of optimal operation parameters.

* * * * *